US008819345B2

(12) United States Patent
Zetterman et al.

(10) Patent No.: US 8,819,345 B2
(45) Date of Patent: Aug. 26, 2014

(54) METHOD, APPARATUS, AND COMPUTER PROGRAM PRODUCT FOR INTER-CORE COMMUNICATION IN MULTI-CORE PROCESSORS

(75) Inventors: Tommi Juhani Zetterman, Espoo (FI); Kalle August Raiskila, Nukari (FI); Harri Hirvola, Espoo (FI)

(73) Assignee: Nokia Corporation, Espoo (FI)

( * ) Notice: Subject to any disclaimer, the term of this patent is extended or adjusted under 35 U.S.C. 154(b) by 289 days.

(21) Appl. No.: 13/399,048

(22) Filed: Feb. 17, 2012

(65) Prior Publication Data

US 2013/0219130 A1     Aug. 22, 2013

(51) Int. Cl.
*G06F 12/08*     (2006.01)

(52) U.S. Cl.
CPC .......... *G06F 12/084* (2013.01); *G06F 12/0806* (2013.01)
USPC ..................... 711/147; 711/141; 711/E12.016

(58) Field of Classification Search
CPC .... G06F 12/00; G06F 12/084; G06F 12/0806
USPC ................... 711/147, 141, E12.016; 710/266
See application file for complete search history.

(56) References Cited

U.S. PATENT DOCUMENTS

| | | | |
|---|---|---|---|
| 5,127,098 A | 6/1992 | Rosenthal et al. | |
| 5,210,861 A | 5/1993 | Shimoda | |
| 6,061,711 A | 5/2000 | Song et al. | |
| 6,463,532 B1 | 10/2002 | Reuter et al. | |
| 6,959,316 B2 | 10/2005 | Parviainen | |
| 7,225,446 B2 | 5/2007 | Whitton | |
| 7,966,519 B1 | 6/2011 | Aggarwal et al. | |
| 2010/0107174 A1 | 4/2010 | Suzuki et al. | |
| 2010/0115528 A1 | 5/2010 | Piipponen et al. | |
| 2010/0291942 A1 | 11/2010 | Piipponen et al. | |
| 2010/0332798 A1 | 12/2010 | Doerr et al. | |
| 2011/0009069 A1 | 1/2011 | Parssinen et al. | |
| 2011/0047310 A1* | 2/2011 | Bonola ........................ 710/268 |
| 2011/0082935 A1 | 4/2011 | Zetterman et al. | |
| 2013/0252543 A1* | 9/2013 | Badi et al. .................... 455/41.1 |

FOREIGN PATENT DOCUMENTS

WO     WO 9734237     9/1997
WO     WO 2012134776 A1 *     10/2012

OTHER PUBLICATIONS

John L. Hennessy, et al. "Instruction-Level Parallelism: Concepts and Challenges", Chapter Two, Instruction-Level Parallelism and Its Exploitation, Computer Architecture: A Quantitative Approach, Fourth Edition, Morgan Kaufham, 2007, pp. 66-151.

(Continued)

*Primary Examiner* — Pierre-Michel Bataille
(74) *Attorney, Agent, or Firm* — Locke Lord LLP

(57) ABSTRACT

Method, apparatus, and computer program product embodiments of the invention are disclosed for efficient communication between processor units in a multi-core processor integrated circuit architecture. In example embodiments of the invention, a method comprises: storing with a shared inter-core communication unit in a multi-core processor, first data produced by a producer processor core, in a first token memory located at a first memory address of a memory address space; and connecting with the shared inter-core communication unit, the first token memory to a consumer processor core of the multi-core processor, to load the first data from the first token memory into the consumer processor core, in response to a first-type command from the producer processor core.

15 Claims, 28 Drawing Sheets

(56) References Cited

OTHER PUBLICATIONS

Miika J. Niiranen, Transport Triggered Architectures on FPGA; Technical Report, Tampere University of Technology, Department of Information Technology, Institute of Digital and Computer Systems, Version 1.1, Nov. 17, 2004, pp. 1-60.

Tempesti, et al., A Move Processor for Bio-Inspired Systems, Proceedings of the 2005 NASA/DoD Conference of Evolution Hardware (EH'05), 0-7695-4/05, IEEE Computer Society.

P. Hamalainen, et al., Design of Transport Triggered Architecture Processors for Wireless Encryption, Proceedings of the 2005 8th Euromicro conference on Digital System Design (DSD'05) 0-7695-2433-08/05, IEEE Computer Society.

H. Corporeal, "Transport Triggered Architectures Examined for General Purpose Applications", Sixth Workshop on Computer Systems, Delft, pp. 55-71, Jan. 1993.

Jan Hoogerbrugge, et al., Comparing Software Pipelining for an Operation-Triggered and a Transport-Triggered Architecture, Proceeding CC '92 Proceedings of the 4th International Conference on Compiler Construction, Springer-Verlag London, UK ©1992, pp. 219-228, ISBN:3-540-55984-1.

H. Corporeal, Design of Transport Triggered Architectures, VLSI, 1994, Design Automation of High Performance VLSI Systems. GLSV '94, Proceedings., Fourth Great Lakes Symposium, Mar. 4-5, 1994, Delft Univ. of Technol., pp. 130-135.

Jan Hoogerbrugge, et al., Register File Port Requirements of Transport Triggered Architectures, Delft University of Technology, Department of Electrical Engineering, MICRO 27 Proceedings of the 27th annual international symposium on Microarchitecture, ACM New York, NY, USA ©1994, ISBN:0-89791-707-3, pp. 191-195.

Jan Hoogerbrugge, et al., Automatic Synthesis of Transport Triggered Processors (1995), Proc. First Ann. Conf., Advanced School for Computing and Imaging, Heijen, The Netherlands, 1995.

J. Heikkinen, et al., Design of Transport Triggered Architecture Processor for Discrete Cosine Transform, ASIC/SOC Conference, 2002. 15th Annual IEEE International, pp. 87-91.

P. Jääskeläinen, et al., Reducing Context Switch Overhead with Compiler-Assisted Threading, EUC '08: Proceedings of the 2008 IEEE/IFIP International Conference on Embedded and Ubiquitous Computing—vol. 02 , vol. 02, IEEE Computer Society Washington, DC, USA ©2008, ISBN: 978-0-7695-3492-3, pp. 461-466.

J. Jansen, et al, Partitioned Register File for TTAs, Proceedings of the 28th annual international symposium on Microarchitecture, IEEE Computer Society Press Los Alamitos, CA, USA ©1995, ISBN:0-8186-7349-4, pp. 303-312.

International Search Report for International Application No. PCT/FI2013/050088 mail dated Jul. 16, 2013.

\* cited by examiner

METHOD, APPARATUS, AND COMPUTER PROGRAM PRODUCT FOR INTER-CORE COMMUNICATION IN MULTI-CORE PROCESSORS

FIELD

The embodiments relate to the architecture of integrated circuit computer processors, and more particularly to efficient communication between processor units in a multi-core processor integrated circuit architecture.

BACKGROUND

Traditional telephones have evolved into smart phones that have advanced computing ability and wireless connectivity. A modern Smartphone typically includes a high-resolution touch screen, a web browser, GPS navigation, speech recognition, sound synthesis, a video camera, Wi-Fi, and mobile broadband access, combined with the traditional functions of a mobile phone. Providing so many sophisticated technologies in a small, portable package, has been possible by implementing the internal electronic components of the Smartphone in high density, large scale integrated circuitry.

A multi-core processor is a multiprocessing system embodied on a single very large scale integrated semiconductor chip. Typically two or more processor cores may be embodied on the multi-core processor chip, interconnected by a bus that may also be formed on the same multi-core processor chip. There may be from two processor cores to many processor cores embodied on the same multi-core processor chip, the upper limit in the number of processor cores being limited by only by manufacturing capabilities and performance constraints. The multi-core processors may have applications including specialized arithmetic and/or logical operations performed in multimedia and signal processing algorithms such as video encoding/decoding, 2D/3D graphics, audio and speech processing, image processing, telephony, speech recognition, and sound synthesis.

SUMMARY

Method, apparatus, and computer program product embodiments of the invention are disclosed for efficient communication between processor units in a multi-core processor integrated circuit architecture.

In example embodiments of the invention, a method comprises:

storing with a shared inter-core communication unit in a multi-core processor, first data produced by a producer processor core, in a first token memory located at a first memory address of a memory address space; and connecting with the shared inter-core communication unit, the first token memory to a consumer processor core of the multi-core processor, to load the first data from the first token memory into the consumer processor core, in response to a first-type command from the producer processor core.

In example embodiments of the invention, the method further comprises:

connecting with the shared inter-core communication unit, an input token memory located at an input token memory address of the memory address space, to the producer processor core of the multi-core processor, to load input data from the first token memory into the producer processor core, in response to a second-type command from the producer processor core;

storing with the shared inter-core communication unit, result data produced by the producer processor core from the input data, the result data being the first data stored in the first token memory; and connecting with the shared inter-core communication unit, the first token memory to the consumer processor core of the multi-core processor, to load the result data from the first token memory into the consumer processor core, in response to the first-type command from the producer processor core.

In example embodiments of the invention, the method further comprises:

storing with the shared inter-core communication unit, second result data produced by the consumer processor core from the first said result data, in a second token memory located at a second memory address of the memory address space.

In example embodiments of the invention, the method further comprises:

connecting with a second shared inter-core communication unit of the multi-core processor, the second token memory to a third processor core of the multi-core processor, to load the second result data from the second token memory as pipelined data into the third processor core, in response to a command from the consumer processor core.

In example embodiments of the invention, the method further comprises:

storing with the second shared inter-core communication unit, third result data produced by the third processor core from the second result data, in a third token memory located at a third memory address of the memory address space.

In example embodiments of the invention, the method further comprises:

connecting with the shared inter-core communication unit, the second token memory to the producer processor core of the multi-core processor, to load the second result data from the second token memory as feedback data into the producer processor core, in response to a command from the consumer processor core.

In example embodiments of the invention, an apparatus comprises:

at least two processors;

at least one memory including computer program code;

the at least one memory and the computer program code configured to, with the at least one processor, cause the apparatus at least to:

store with a shared inter-core communication unit in a multi-core processor, first data produced by a producer processor core, in a first token memory located at a first memory address of a memory address space; and connect with the shared inter-core communication unit, the first token memory to a consumer processor core of the multi-core processor, to load the first data from the first token memory into the consumer processor core, in response to a first-type command from the producer processor core.

In example embodiments of the invention, a computer program product comprising computer executable program code recorded on a computer readable non-transitory storage medium, the computer executable program code, when executed by a computer processor, cause an apparatus to at least perform the following:

storing with a shared inter-core communication unit in a multi-core processor, first data produced by a producer processor core, in a first token memory located at a first memory address of a memory address space; and connecting with the shared inter-core communication unit, the first token memory to a consumer processor core of the multi-core processor, to load the first data from the first token memory into the consumer processor core, in response to a first-type command from the producer processor core.

In this manner, embodiments of the invention provide efficient communication between processor units in a multi-core processor integrated circuit architecture.

DISCUSSION OF EXAMPLE EMBODIMENTS OF THE INVENTION

A multi-core processor is a multiprocessing system embodied on a single large scale integrated semiconductor chip. Typically two or more processor cores may be embodied on the multi-core processor chip, interconnected by a bus that may also be formed on the same multi-core processor chip. There may be from two processor cores to many processor cores embodied on the same multi-core processor chip, the upper limit in the number of processor cores being limited by only by manufacturing capabilities and performance constraints. The multi-core processors may have applications including specialized arithmetic and/or logical operations performed in multimedia and signal processing algorithms such as video encoding/decoding, 2D/3D graphics, audio and speech processing, image processing, telephony, speech recognition, and sound synthesis.

Software defined radio baseband applications often require large data chunks or data tokens to be transferred between different instances of computational kernels. Examples of this include in-phase/quadrature phase (I/Q) samples of a received sample stream that typically range in size from a packet to larger chunks, based on the amount of data typically needed during a single kernel firing, such as during fast Fourier transform operations. Other examples may include data loaded or unloaded in Long Term Evolution (LTE) Hybrid Automatic Repeat Request (HARM) buffers. If the kernel producing token is executed on different processor core than the kernel consuming it, then some form of inter-core communication has to be applied. Efficient inter-core communication should have predictable memory access delays to enable real time analysis and to guarantee deadlines, and further should have a low latency and low energy consumption.

Method, apparatus, and computer program product embodiments of the invention are disclosed for efficient communication between processor units in a multi-core processor integrated circuit architecture.

Figure 1:
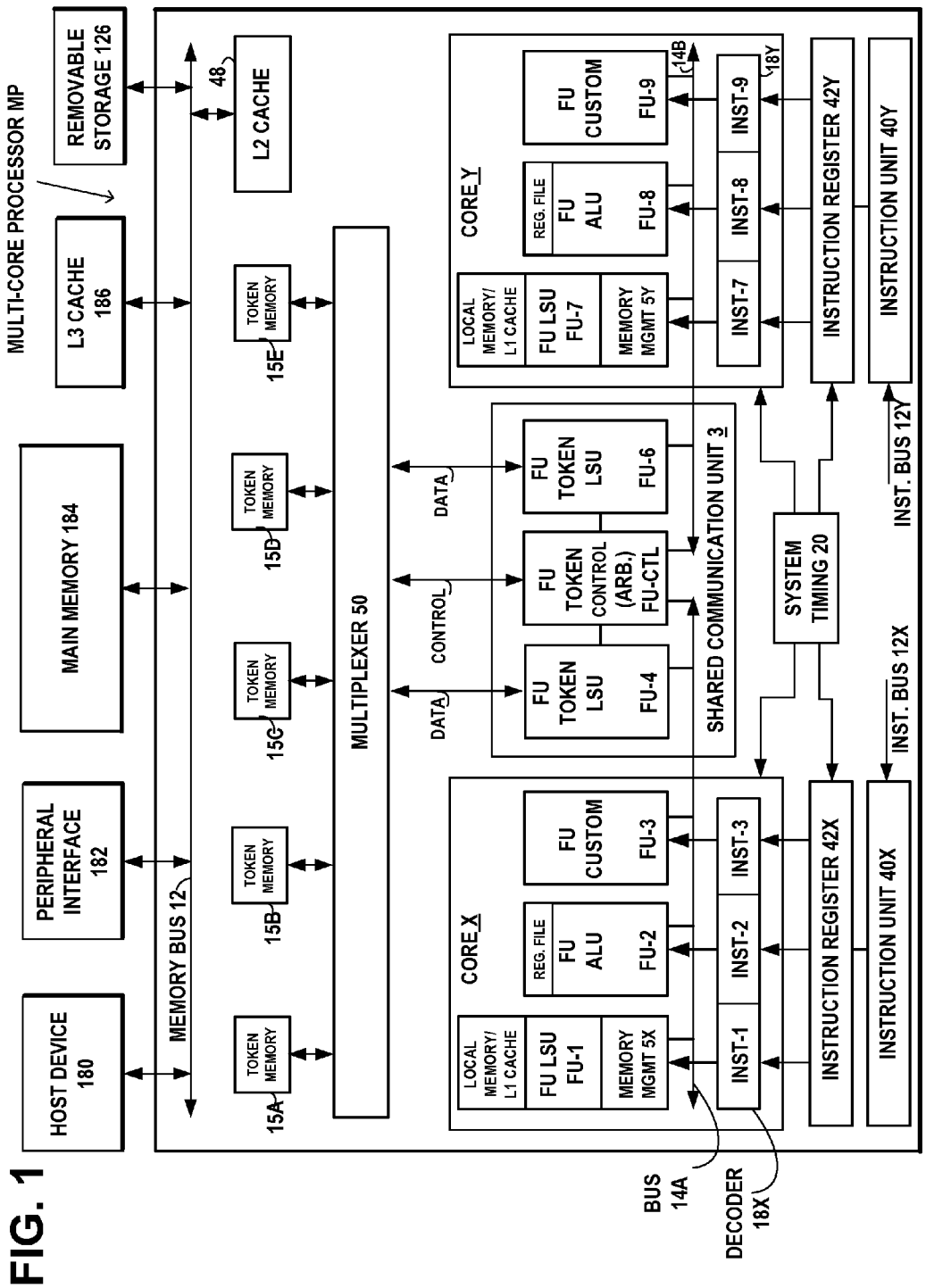
FIG. 1 illustrates an example embodiment of the system architecture of a multi-core processor that includes a first processor core, a second processor core, a plurality of token memories, and a token control functional unit in a shared inter-core communication unit that manages the connectivity of the token memories with the first and second processor cores, in accordance with example embodiments of the invention.

FIG. 1 illustrates an example embodiment of the invention, showing an example system architecture of a multi-core processor MP. The multi-core processor MP may include a first processor core X, a second processor core Y, a plurality of token memories 15A, 15B, 15C, 15D, and 15E, and a token control functional unit FU-CTL in a shared inter-core communication unit 3 that manages the connectivity of the token memories with the first and second processor cores, in accordance with example embodiments of the invention. The multiplexer 50 is controlled by the token control functional unit (CU-CTL) in the shared inter-core communication unit 3 to interconnect the token memories 15A, 15B, 15C, 15D, and 15E with the processor core X and processor core Y.

In an example embodiment of the invention, the core X may include a memory management unit 5X, a load and store unit functional unit FU-1 that executes instructions INST-1, a arithmetic/logic (ALU) functional unit FU-2 that executes instructions INST-2, and an custom functional unit FU-3 that executes instructions INST-3. Instruction bus 12X provides instructions to instruction unit 40X, which in turn applies the instructions to the processor core X in accordance with the system timing 20.

Similarly, in an example embodiment of the invention, the core Y may include a memory management unit 5Y, a load and store unit functional unit FU-7 that executes instructions INST-7, an arithmetic/logic (ALU) functional unit FU-8 that executes instructions INST-8, and a custom functional unit FU-9 that executes instructions INST-9. Instruction bus 12Y provides instructions to instruction unit 40Y, which in turn applies the instructions to the processor core Y in accordance with the system timing 20.

In an example embodiment of the invention, the processor cores X and Y may be interconnected by the shared inter-core communication unit 3. The bus 14A interconnects processor core X with the token load and store functional unit FU-4 in the shared inter-core communication unit 3. The bus 14B interconnects processor core Y with token load and store functional unit FU-6 in the shared inter-core communication unit 3. The token control unit FU-CTL is connected both to the processor core X and to the processor core Y via buses 14A and 14B, respectively. The token control unit FU-CTL may include a memory address map of the addresses of the token memories 15A, 15B, 15C, 15D, and 15E in the address space 100 shown in FIG. 1A. The multiplexer 50 is controlled by the token control unit FU_CTL to interconnect the token memories 15A, 15B, 15C, 15D, and 15E with the processor core X and processor core Y. The shared inter-core communication unit 3 may receive commands such as get_data( ) or send_data( ) from the processor core X and the processor core Y, which correspond to predetermined address ranges of the token memories 15A, 15B, 15C, 15D, and 15E in the memory address space 100. The get_data( ) or send_data( ) instructions may be part of the instruction stream executed in processor core X or processor core Y. Most probably, the get_data( ) and send_data( ) instructions may originate from an instruction decoder 18X associated with the FU-2 functional processor of core X or an instruction decoder 18Y associated with the FU-8 functional processor in core Y. But, since FU-2 may be only part of the processor core X and FU-8 may be only part of the processor core Y, it may also be possible that some other individual functional processor unit is the source of these instructions. The memory address map in the token control unit FU-CTL relates the physical address space and a set of symbolic address names used in instruction code executed in functional unit FU-2 or FU-8.

In an example embodiment of the invention, there may be from two processor cores to many processor cores embodied on the same multi-core processor MP chip, the upper limit in the number of processor cores being limited by only by manufacturing capabilities and performance constraints. In example embodiments of the invention, the processor cores X and Y may be identical cores. In example embodiments of the invention, the processor cores X and Y may not be identical. The terms functional unit, functional processor, and functional processor unit are used interchangeably herein.

Figure 1A:
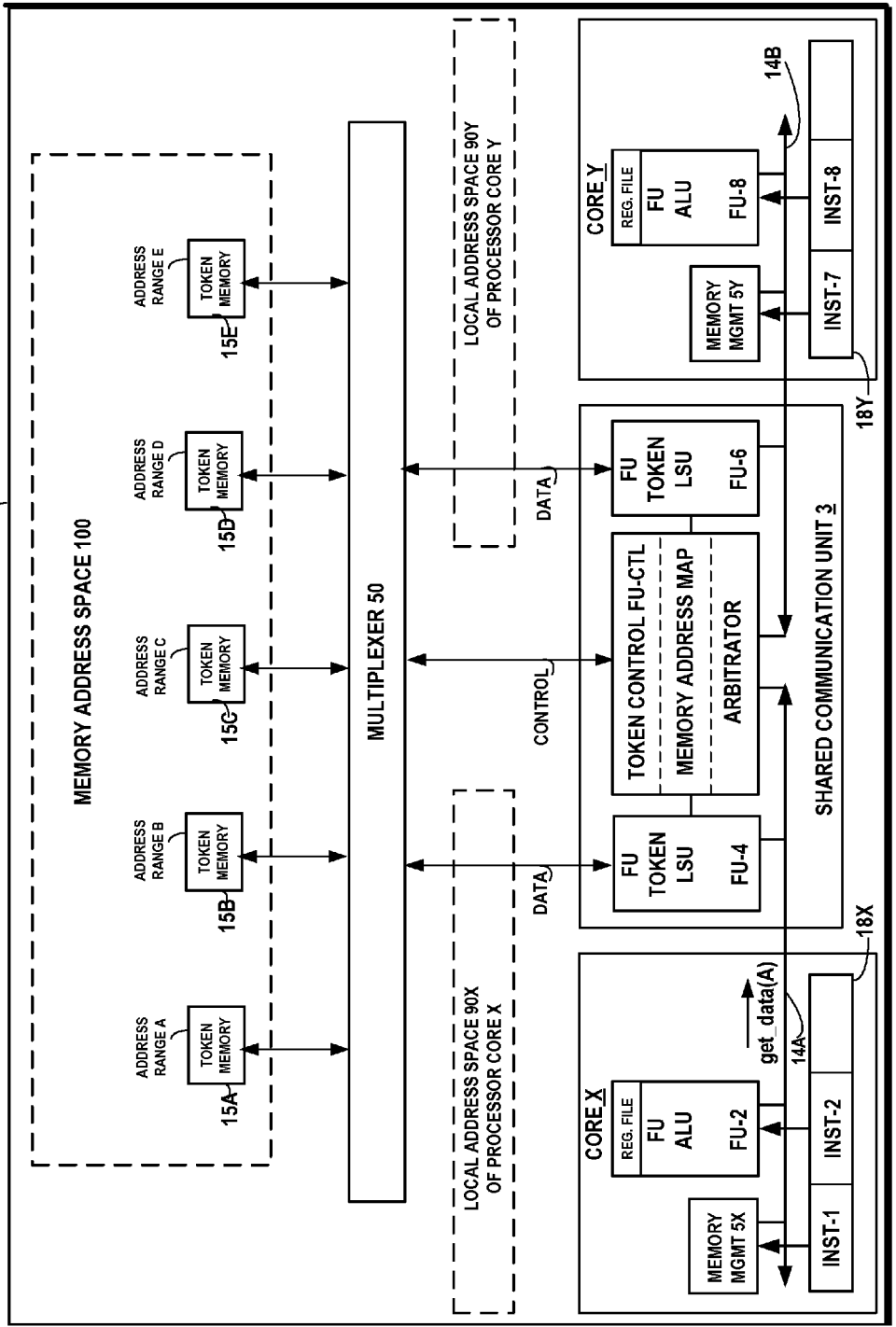
FIG. 1A illustrates an example embodiment of the of a multi-core processor architecture of FIG. 1, illustrating the plurality of token memories in a memory address space managed by the shared inter-core communication unit, in accordance with example embodiments of the invention.

FIG. 1A illustrates an example embodiment of the invention, wherein the multi-core processor architecture of FIG. 1, may include the plurality of token memories 15A, 15B, 15C, 15D, and 15E in a memory address space 100 managed by the shared inter-core communication unit 3, in accordance with example embodiments of the invention. Each token LSU unit is located in a predetermined address range in the local memory address space of the processor core to which the token LSU unit is connected to. For example, token LSU unit FU-4 is located in a predetermined address range in the local address space 90X of the processor core X, and token LSU unit FU-6 is located in a predetermined address range in the local address space 90Y of the processor core Y. The local address spaces 90X and 90Y of processor cores X and Y may be independent of each other and address space 100.

Each token memory is located in a predetermined address range of the memory address space 100, which is recognized by the token LSU unit FU-4 in the instruction stream processed by processor core X and, similarly, which is recognized by the token LSU unit FU-6 in the instruction stream processed by the processor core Y. Token memory 15A is in address range A. Token memory 15B is in address range B. Token memory 15C is in address range C. Token memory 15D is in address range D. Token memory 15E is in address range E.

In an example embodiment of the invention, when the instruction decoding unit 18X or some functional unit in the processor core X recognizes a predetermined token memory address in the instruction stream processed by a functional processor in the processor core X, the address or a related command may be sent over the bus 14A to the token control unit FU-CTL. The token control unit FU-CTL will look up in a memory address map the physical address (or virtual address) of the token memory being addressed and will cause the load and store unit FU-1 to send this information to the multiplexer 50 to cause it to connect the addressed token memory to the functional processor in the processor core X.

In an example embodiment of the invention, when the instruction decoding unit 18Y or some functional unit in the processor core Y recognizes a predetermined token memory address in the instruction stream processed by a functional processor in the processor core Y, the address or a related command may be sent over the bus 14B to the token control unit FU-CTL. The token control unit FU-CTL will look up in a memory address map the physical address (or virtual address) of the token memory being addressed and will cause the load and store unit FU-7 to send this information to the multiplexer 50 to cause it to connect the addressed token memory to the functional processor in the processor core Y.

Figure 1B:
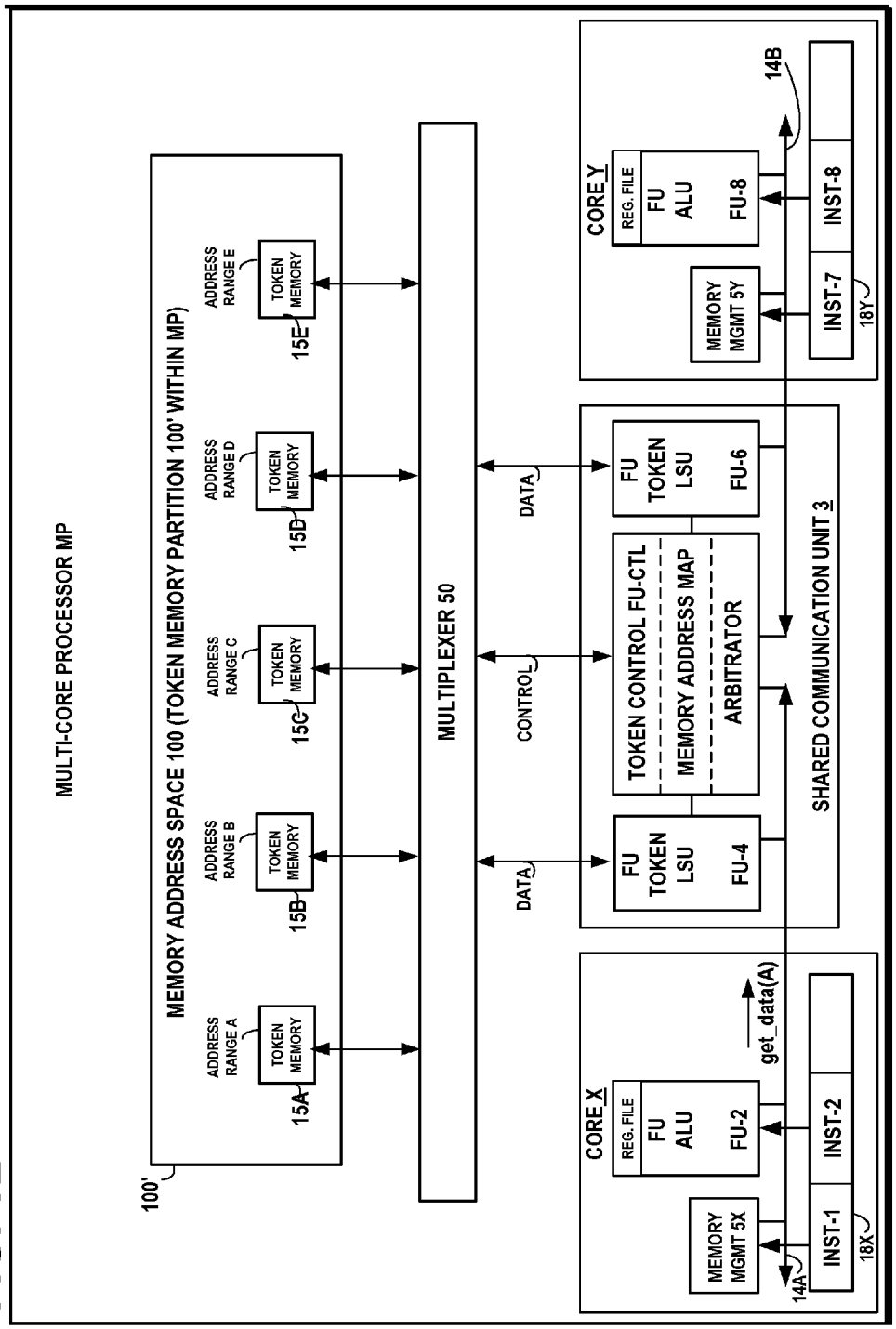
FIG. 1B illustrates an example embodiment of the of a multi-core processor architecture of FIG. 1, illustrating the plurality of token memories in a token memory partition within the multi-core processor that is part of the memory address space managed by the shared inter-core communication unit, in accordance with example embodiments of the invention.

FIG. 1B illustrates an example embodiment of the invention, wherein the multi-core processor architecture of FIG. 1A, may include the plurality of token memories 15A, 15B, 15C, 15D, and 15E in a token memory partition 100' formed within the multi-core processor MP that is part of the memory address space 100 managed by the shared inter-core communication unit 3, in accordance with example embodiments of the invention.

Figure 1C:
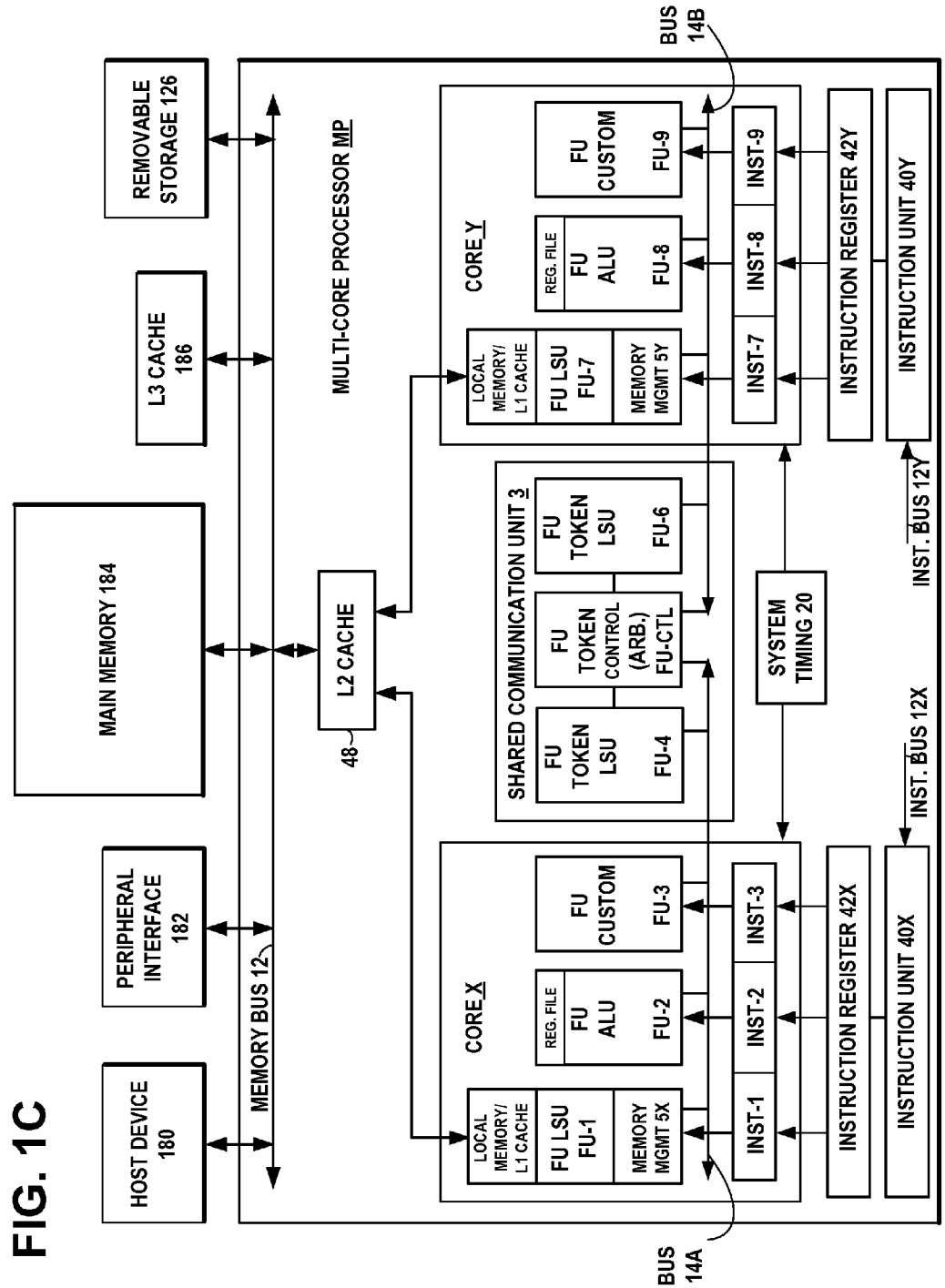
FIG. 1C illustrates an example embodiment of the of a multi-core processor architecture of FIG. 1, illustrating an example of the load and store units of the core processors accessing the cache and main memory system of FIG. 1, in accordance with example embodiments of the invention.

FIG. 1C illustrates an example embodiment of the invention, wherein the multi-core processor architecture of FIG. 1, may include an example of the load and store units FU-1 in the processors core X and the load and store units FU-7 in the processors core Y accessing the L1 cache, L2 cache 48, L3 cache 186, and/or main memory 184 of the main memory system of FIG. 1, in accordance with example embodiments of the invention. In an example embodiment of the invention, the memory bus 12 may be connected to a Level 2 (L2) cache 186 on the same semiconductor chip or of a separate semiconductor chip. The L2 cache may be connected to an off-chip L3 cache 186 and a main memory 184 and/or other forms of bulk storage of data and/or program instructions. In an example embodiment of the invention, when the memory management unit 5Y in the processor core Y recognizes a predetermined memory address of the main memory system in the instruction stream processed by a functional processor in the processor core Y, the address is handled by the load and store unit FU-7 in the core Y. Similarly, when the memory management unit 5X in the processor core X recognizes a predetermined memory address in the main memory system in the instruction stream processed by a functional processor in the processor core X, the address is handled by the load and store unit FU-1 in the core X.

Figure 1D:
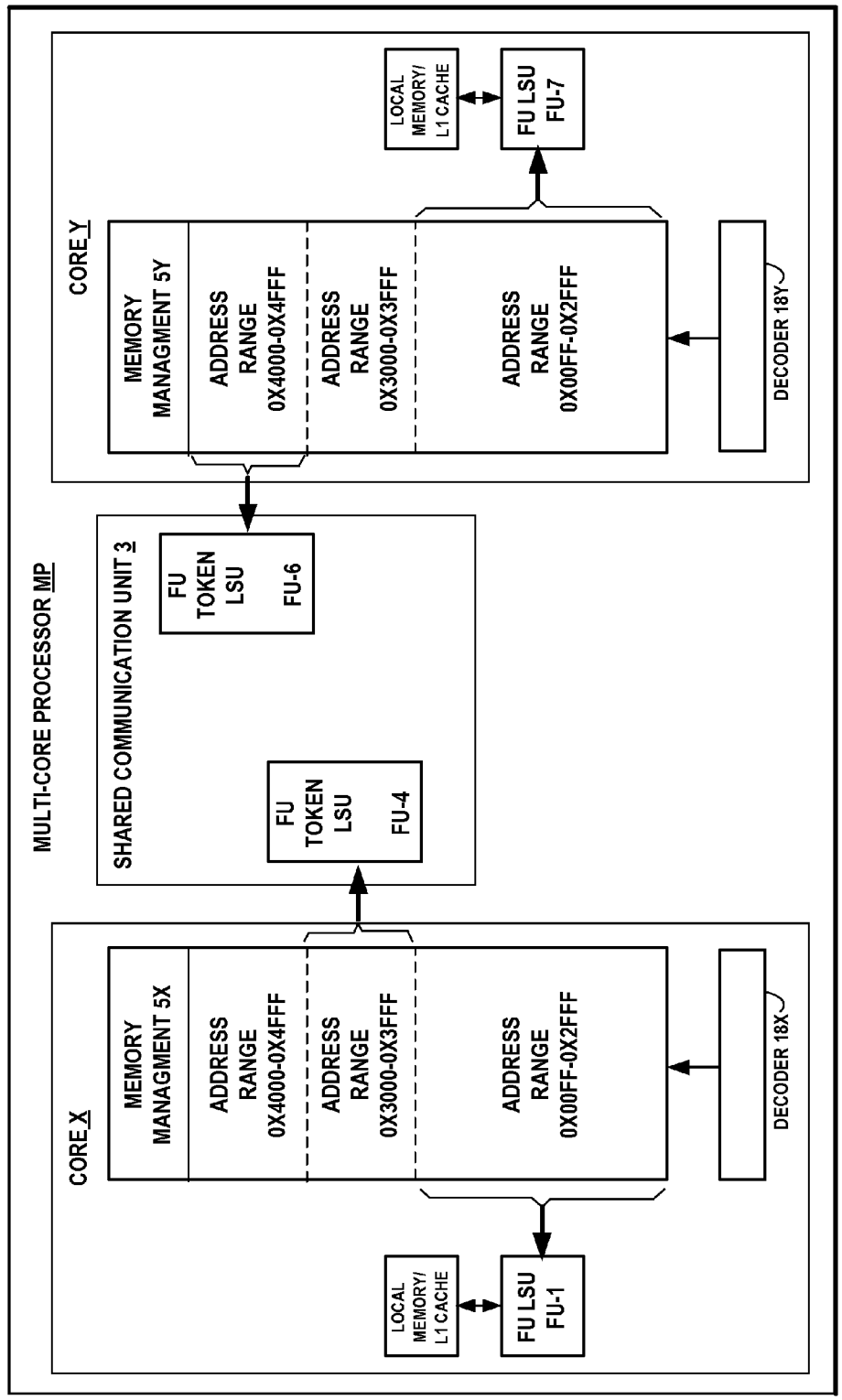
FIG. 1D illustrates an example embodiment of the of a multi-core processor architecture of FIG. 1, illustrating the memory management units of the processor cores selectively directing processor accesses to the shared communication unit and token memories when the processor accesses a predetermined address range in the memory address space managed by the shared inter-core communication unit, in accordance with example embodiments of the invention.

FIG. 1D illustrates an example embodiment of the invention, showing an example implementation for a general purpose processor. The multi-core processor architecture of FIG. 1, may include the memory management unit 5X of the processor core X and the memory management unit 5Y of the processor core Y selectively directing processor accesses to the shared communication unit 3 and to token memories 15A, 15B, 15C, 15D, and 15E when an instruction processed in the processor accesses a predetermined address range of a token memory in the memory address space 100 managed by the shared inter-core communication unit 3, in accordance with example embodiments of the invention. In an example embodiment of the invention, the memory management unit 5X in processor core X allocates a predetermined address range of 0X00FF-0X2FFF to memory addresses in the main memory system and instructions being processed that access a memory location within that range will be handled by the load and store unit FU-1 in the core X. In an example embodiment of the invention, the memory management unit 5X in processor core X allocates a predetermined address range of 0X3000-0X3FFF to memory addresses in the token memory address space 100, the address or a related command is sent by the memory management unit 5X over the bus 14A to the token control unit FU-CTL for handling by the load and store unit FU-4 in the shared communication unit 3. Similarly, in an example embodiment of the invention, the memory management unit 5Y in processor core Y allocates a predetermined address range of 0X4000-0X4FFF to memory addresses in the token memory address space 100, the address or a related command is sent by the memory management unit 5Y over the bus 14B to the token control unit FU-CTL for handling by the load and store unit FU-6 in the shared communication unit 3.

It is instructive at this point, to compare the example embodiment for a general purpose processor shown in FIG. 1D, with the example transport triggered architecture (TTA) shown in FIGS. 3 and 3A to 3E. In a TTA processor core, there may not necessarily be any single memory management unit taking care of all memory address translations. For example, if there are multiple LSUs, each LSU may connect to a different logical and/or physical memory address space and memory hierarchy. Therefore, the actual physical memory device implementing the memory space for the token memories may be part of the common memory system or, alternately, it may be a separate physical memory.

In an example embodiment of the invention, the processor cores X and Y may be embodied on two or more separate semiconductor chips that are interconnected by the shared inter-core communication unit 3 and packaged in a multi-chip module. The bus 14A interconnecting processor core X with shared inter-core communication unit 3 and the bus 14B interconnecting processor core Y with shared inter-core communication unit 3 may be embodied as two lines, a clock line and a data line that uses non-return-to-zero signals to represent binary values. In example embodiments of the invention, the memory bus 12 may be connected to a removable storage 126 shown in FIG. 7, based on magnetic, electronic and/or optical technologies such as magnetic disks, optical disks, semiconductor memory circuit devices, and micro-SD semiconductor memory cards (SD refers to the Secure Digital standard) that may serve, for instance, as a program code and/or data input/output means.

Returning to FIG. 1, in an example embodiment of the invention, the memory bus 12 may be connected to the host device 180, such as a network element, direct memory access (DMA) controller, microcontroller, digital signal processor, or memory controller. The term "host device", as used herein, may include any device that may initiate accesses to slave devices, and should not be limited to the examples given of network element, direct memory access (DMA) controller, microcontroller, digital signal processor, or memory controller. In an example embodiment of the invention, memory bus 10 may be connected to any kind of peripheral interface 182, such as camera, display, audio, keyboard, or serial interfaces. The term "peripheral interface", as used herein, may include any device that can be accessed by a processor or a host device, and should not be limited to the examples given of camera, display, audio, keyboard, or serial interfaces, in accordance with at least one embodiment of the present invention.

In an example embodiment of the invention, the processor cores X and Y may implement specialized architectures such as superscalar, very long instruction word (VLIW), vector processing, single instruction/multiple data (SIMD), application-specific instruction set (ASIP) processing, or multi-threading. In an example embodiment of the invention, the functional processors FU-2, FU-3, FU-8, and FU-9 in the multi-core processor MP, may have applications including specialized arithmetic and/or logical operations performed in multimedia and signal processing algorithms such as video encoding/decoding, 2D/3D graphics, audio and speech processing, image processing, telephony, speech recognition, and sound synthesis.

Figure 1E:
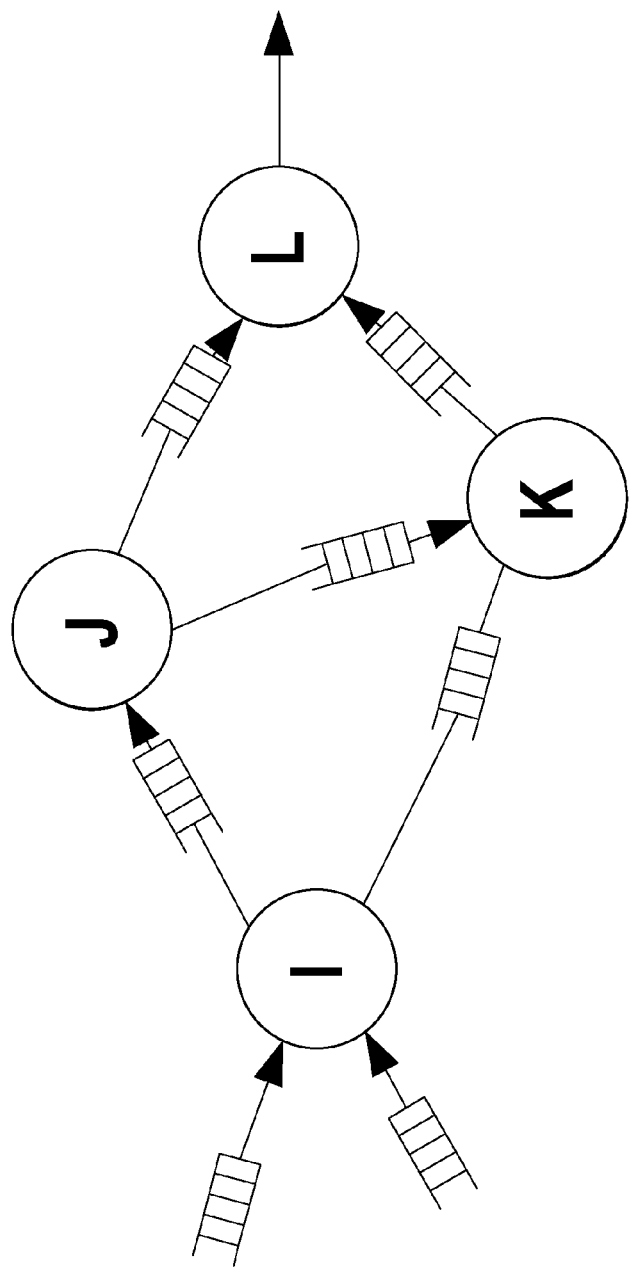
FIG. 1E illustrates an example embodiment of the of a multi-core processor architecture of FIG. 1, illustrating an example of a data flow for computation kernels, which may be executed in parallel in different processor cores, in accordance with example embodiments of the invention.

FIG. 1E illustrates an example embodiment of the invention, of an example data flow in the multi-core processor architecture of FIG. 1. The figure illustrates an example of a data flow for computation kernels I, J, K, and L, which may be executed in parallel in different processor cores X and Y, in accordance with example embodiments of the invention. In the diagram, graph vertexes I, J, K, and L represent computation kernels that may be executed in different cores in parallel. The edges in the data flow diagram represent the communication between kernels and the queues memories used to pass data from one kernel to another. When a kernel is fired, it consumes some amount of data tokens from its input queues, performs the computation, and writes one or more result tokens to one or more output queues. If the number of tokens consumed and produced is constant when firing every kernel, the data flow model is called static data flow and some properties such as firing schedule, deadlock freedom guarantee, deadline guarantee and size of needed token memories may be analyzed during compile time. If the number of consumed tokens varies during the execution, such as in data-dependent execution, then in the general case, those properties cannot be analyzed and the data flow model is called dynamic data flow. Embodiments of the invention may be applied to both the static data flows and dynamic data flows.

Figure 2A:
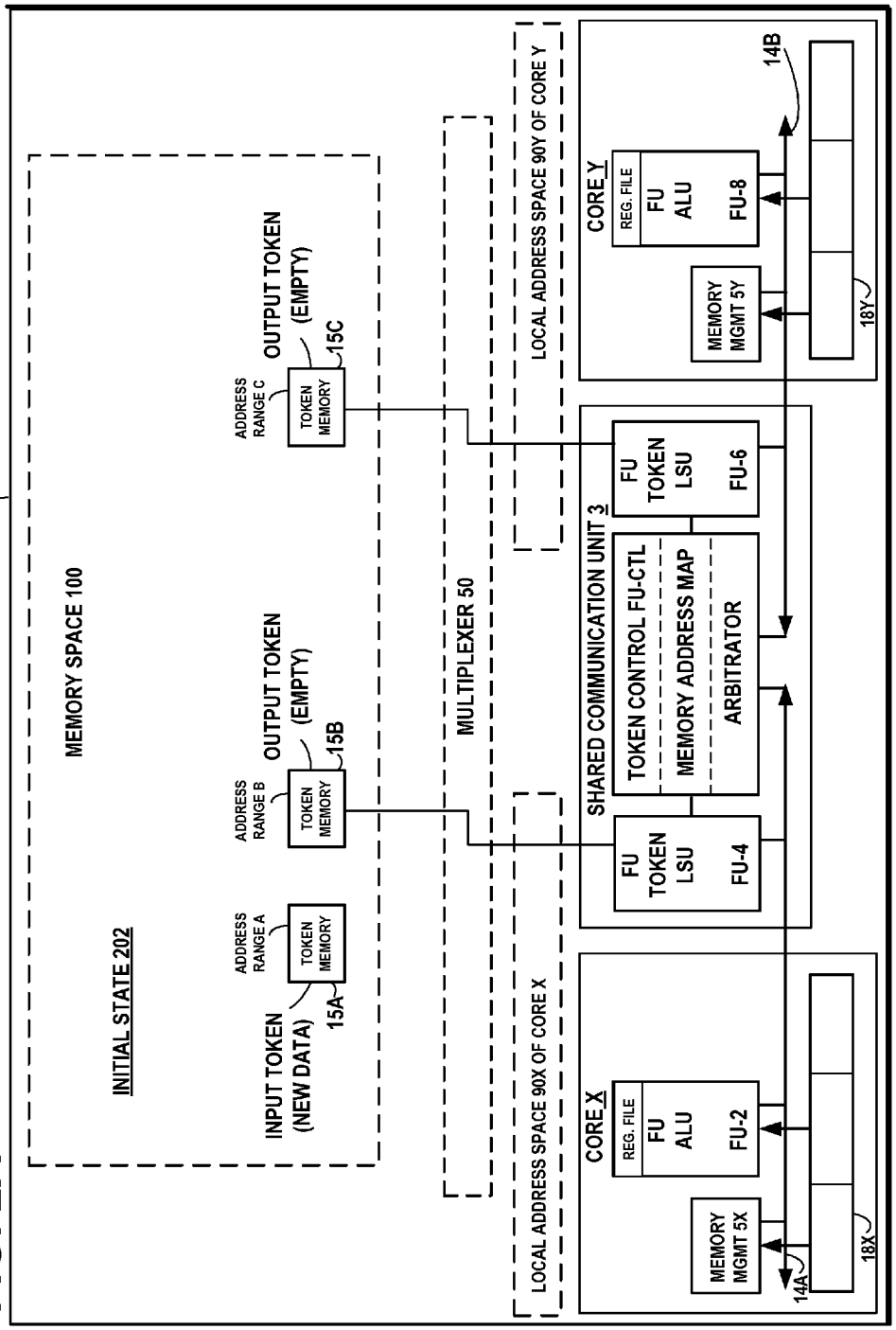
FIG. 2A illustrates an example embodiment of the multi-core processor architecture of FIG. 1, in an initial state with an empty output token memory connected to the shared inter-core communication unit, the figure showing an input token memory that is not connected, but which has been previously filled with initial input data from a source, such as a processor, an input device or the main memory system, in accordance with example embodiments of the invention. For example, the input device may be an RF module interface that uses DMA to transfer samples to the addressed token memory unit.

FIG. 2A illustrates an example embodiment of the multi-core processor architecture of FIG. 1, in an initial state with an empty output token memory 15B connected by the multiplexer 50 to the shared inter-core communication unit 3, the figure showing an input token memory 15A that is disconnected, but which has been previously filled with initial input data from a source, such as a processor or the main memory system, in accordance with example embodiments of the invention. For example, the input device may be an RF module interface that uses DMA to transfer samples to the addressed token memory unit.

Figure 2B:
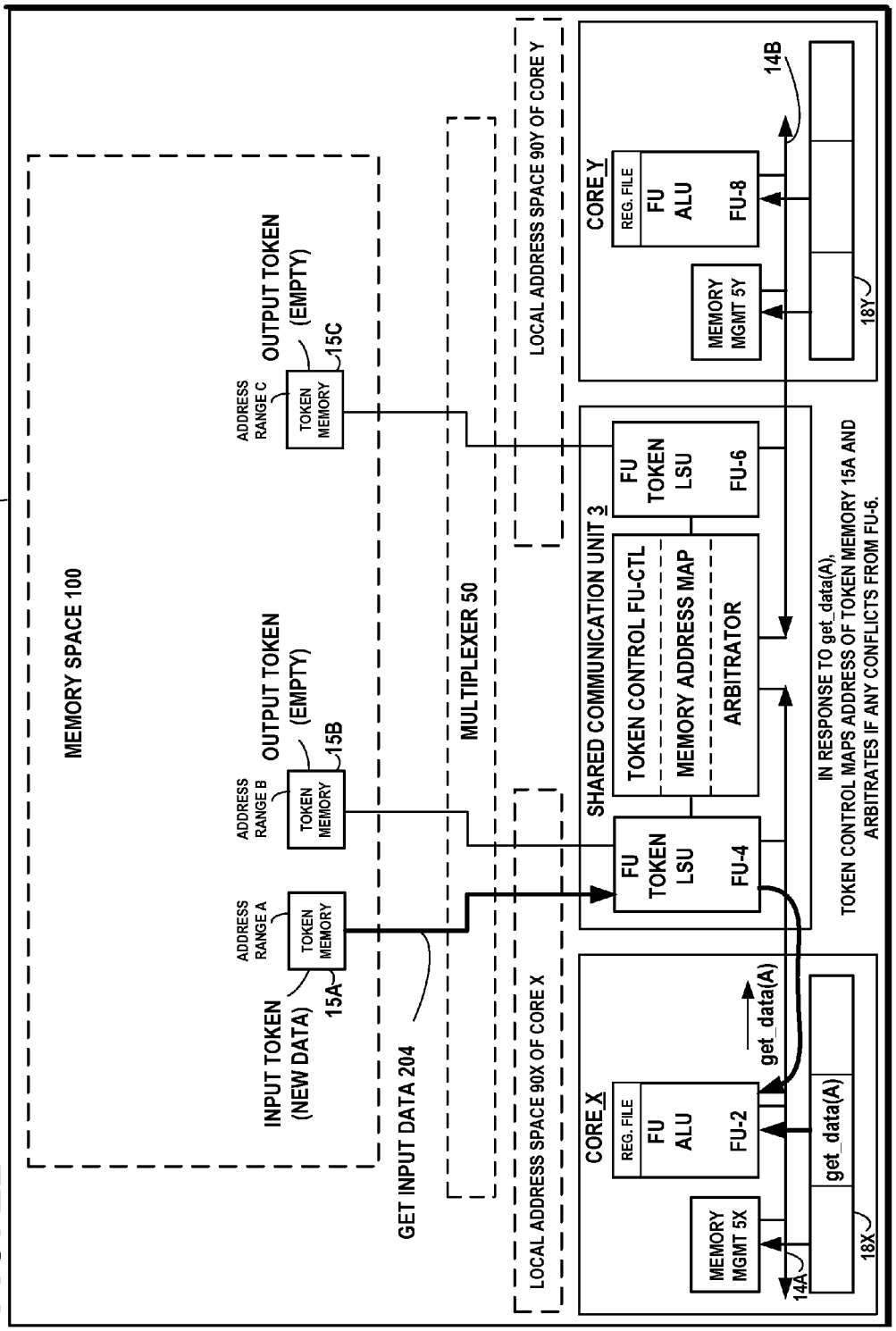
FIG. 2B illustrates an example embodiment of the multi-core processor architecture of FIG. 2A, illustrating receiving input data in the first processor core from the input token memory connected to the shared inter-core communication unit, in response to a token control functional unit in the shared inter-core communication unit receiving a get_data( ) command, in accordance with example embodiments of the invention.

FIG. 2B illustrates an example embodiment of the invention, wherein the multi-core processor architecture of FIG. 2A may include processing an instruction stream by the functional processor ALU FU-2 in processor core X. The instruction stream may have an instruction for accessing the token memory 15A within address range A mapped to the token LSU FU-4 within a local address space 90X of core X, which is further mapped to the memory address space 100 by using multiplexer 50 to connect FU-4 to the token memory. The processor core X sends a get_data(A) command to the token control unit LSU-CTL. In response to the get_data(A) command, the token control unit FU-CTL configures multiplexer 50 so that the memory operations of core X to the local address space range 90X associated to the token LSU FU-4 are performed for the token memory 15A. In this example, the instructions in the instruction stream are to load data from the token memory 15A into the register file of the functional processor ALU FU-2. FU-CTL may look up in its memory address map the physical address (or virtual address) of the token memory 15A being addressed, check for conflicting access or reservation with its arbitrator, and then cause the configuration of multiplexer 50 to be denied or delayed until the conflicting access or reservation is finished.

Figure 2C:
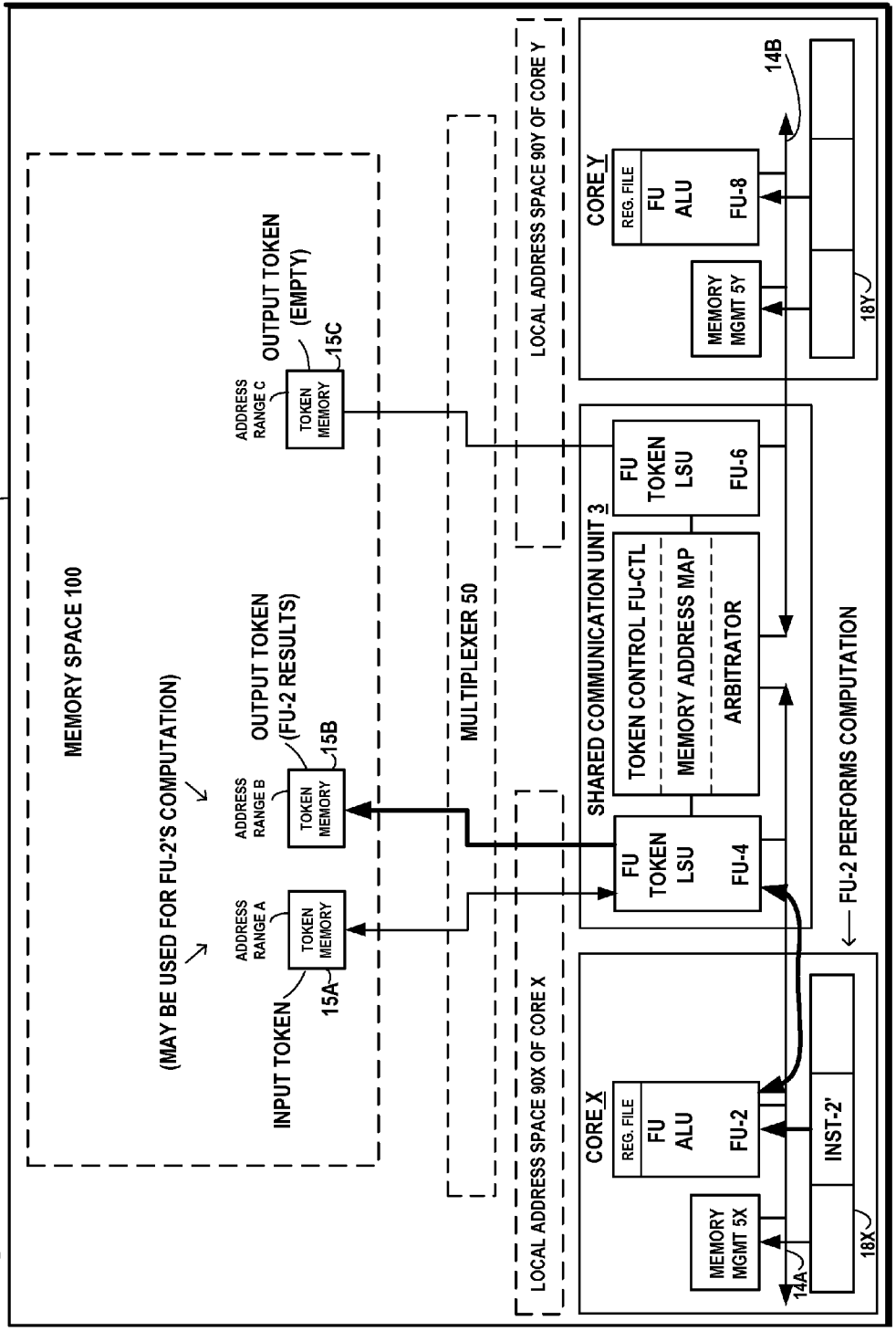
FIG. 2C illustrates an example embodiment of the multi-core processor architecture of FIG. 2B, illustrating a functional ALU unit in the first processor core processing the input data and producing result data to the output token memory connected to the shared inter-core communication unit, in accordance with example embodiments of the invention.

FIG. 2C illustrates an example embodiment of the invention, wherein the multi-core processor architecture of FIG. 2B, may include the functional processor ALU FU-2 in the processor core X, processing the input data from token memory 15A and producing result data to be written to the output token memory 15B connected to the shared inter-core communication unit 3, in accordance with example embodiments of the invention. The instruction stream may have an instruction for accessing the token memory 15B within a local address range B mapped to the token LSU FU-4 within a local address space 90X of core X, which is further mapped to the memory address space 100 by using multiplexer 50 to connect FU-4 to the token memory. The processor core X sends an acquire_output(A) command to the token control unit LSU-CTL. In response to the acquire_output(A) command, the token control unit FU-CTL configures multiplexer 50 so that the memory operations of core X to the local address space range B associated to the token LSU FU-4 are performed for the token memory 15B. The instruction stream being processed by the functional processor ALU FU-2 in processor core X has an instruction for writing result data into the token memory 15B within address range B within the local memory address space 90X of core X. The token LSU unit FU-4 recognizes that this is an access to the local address range B, and forwards the "write_data(B)" command to the token memory 15B connected to the token LSU FU-4 by multiplexer 50.

Figure 2D:
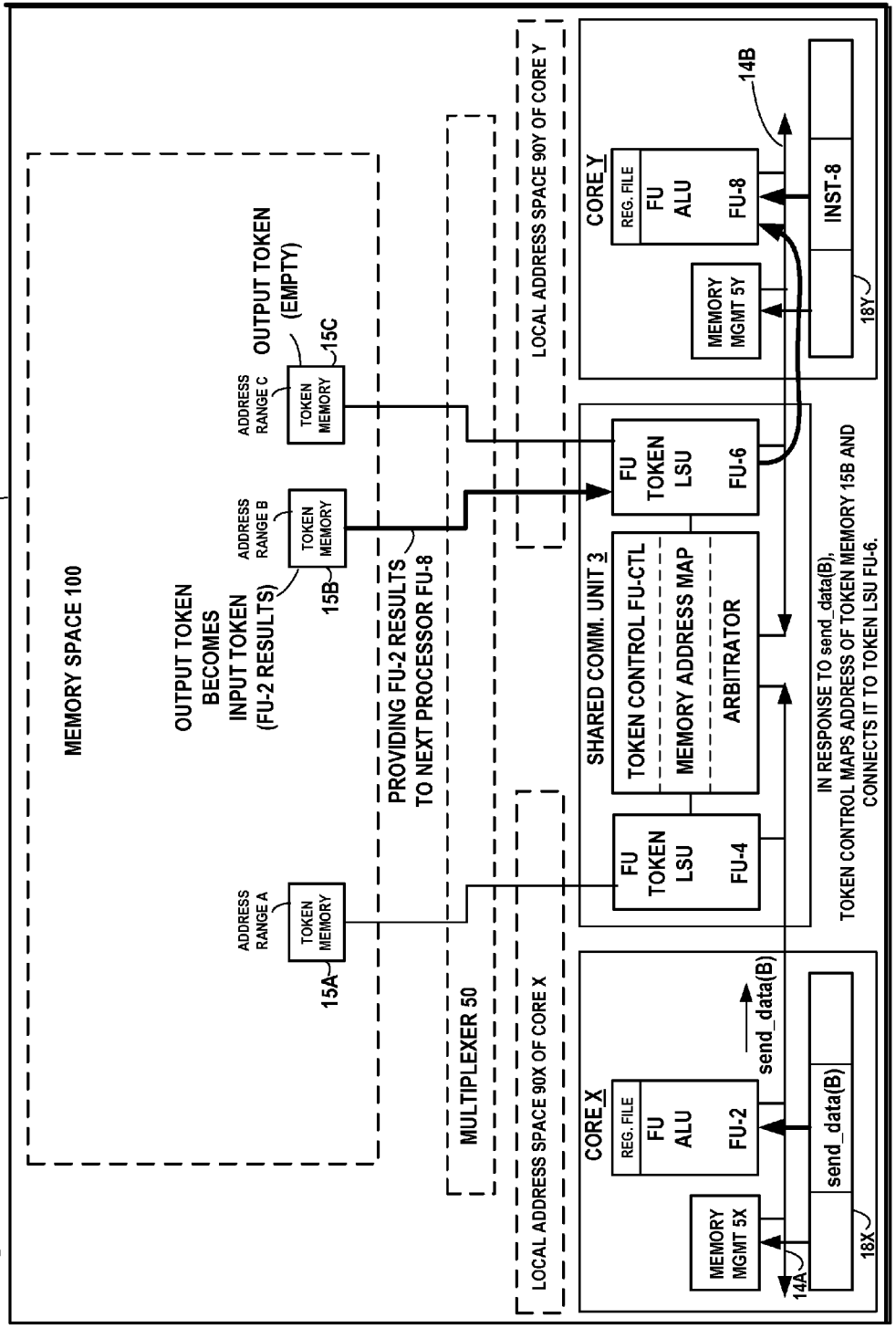
FIG. 2D illustrates an example embodiment of the multi-core processor architecture of FIG. 2C, illustrating output token memory connected to the shared inter-core communication unit sending the result data to a next functional processor in the second processor core, in response to the token control functional unit in the shared inter-core communication unit receiving a send_data( ) command, in accordance with example embodiments of the invention.

FIG. 2D illustrates an example embodiment of the invention, wherein the multi-core processor architecture of FIG. 2C, may include the output token memory 15B that is connected to the shared inter-core communication unit 3, providing the result data to a next functional unit FU-8 in the second processor core Y, in response to the token control functional unit FU-CTL in the shared inter-core communication unit 3 receiving a send_data( ) command, in accordance with example embodiments of the invention. The instruction stream being processed by the processor core X has an instruction for sending the result data in the output token memory 15B to the second processor core Y. The token memory 15B is within address range B within the memory address space 100. The token LSU FU-4 is within an address range within the local address space 90X of core X, which is connected to the address range B in the address space 100 by multiplexer 50 connecting token LSU FU-4 to the token memory 15B. The processor core X sends a send_data(B) command to the token control unit FU-CTL, which configures multiplexer 50 to detach the token memory 15B from the token LSU FU-4 and after that connect the token memory 15B to the token LSU FU-6. FU-CTL may look up its memory address map the physical address (or virtual address) of the token memory 15B being addressed, check for conflicting access or reservation with its arbitrator, and then cause the configuration of multiplexer 50 to be denied or delayed until the conflicting access or reservation is finished. This may be the situation when the core Y is busy processing some previous data and the token LSU FU-6 is connected to some other token memory, which would be considered as a reservation conflict. The end of such a reservation conflict may be safely detected by observing the core Y to send a get_data( ) or acquire_input( ) message to the FU-CTL which would indicate that it is ready to start processing the next data. The operations in the processor core X and the processor core Y may be synchronized by the system timing 20.

Figure 2E:
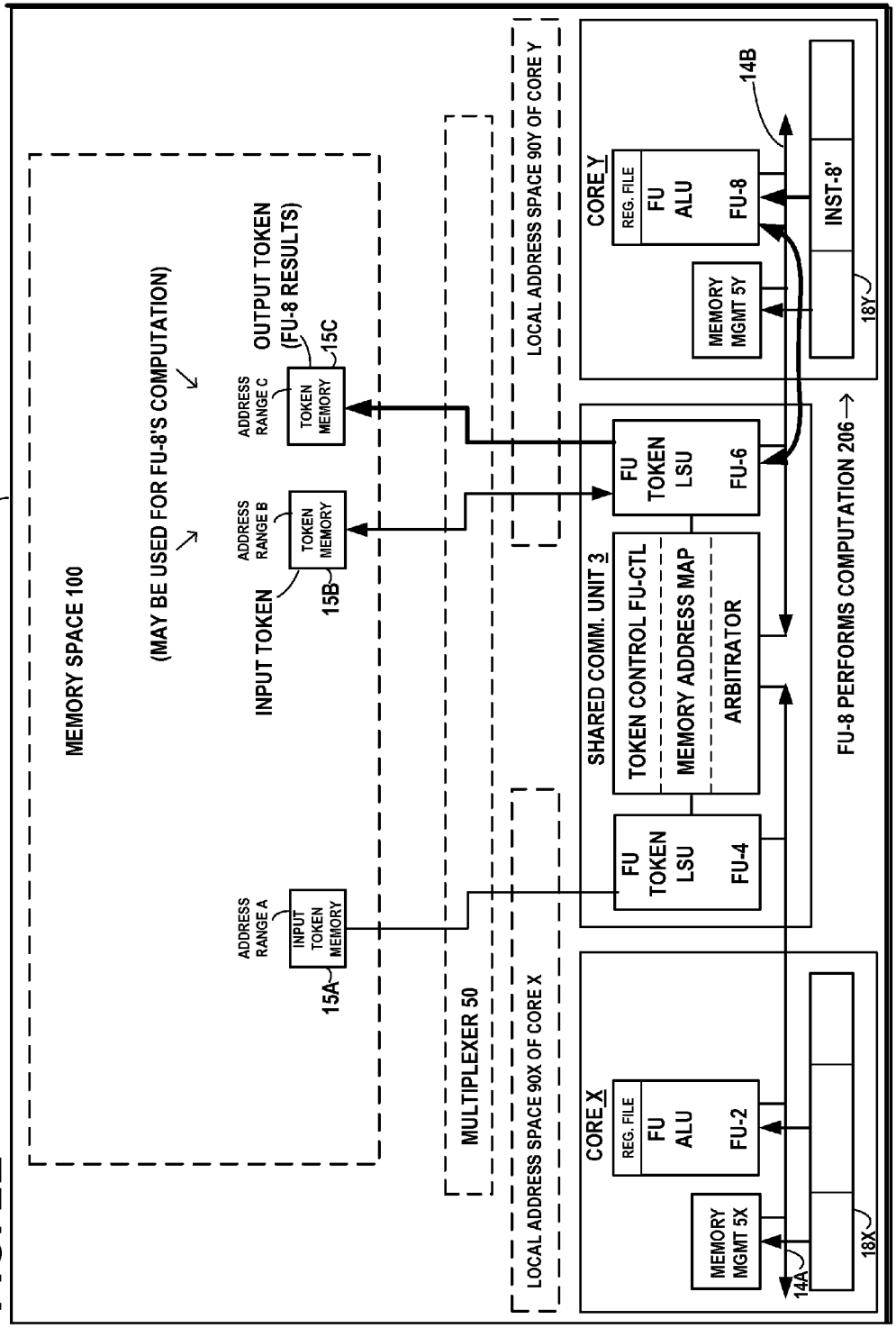
FIG. 2E illustrates an example embodiment of the multi-core processor architecture of FIG. 2D, illustrating a functional ALU unit in the second processor core processing the new input data and producing new result data to a second output token memory connected to the shared inter-core communication unit, in accordance with example embodiments of the invention.

FIG. 2E illustrates an example embodiment of the invention, wherein the multi-core processor architecture of FIG. 2D, may include a functional processor ALU FU-8 in the second processor core Y, processing the new input data from token memory B and producing new result data to a second output token memory 15C connected to the shared inter-core communication unit 3, in accordance with example embodiments of the invention. The instruction stream being processed by the second processor core Y has an instruction for writing second result data into a local processor core Y address space range 90Y mapped to the token LSU FU-6, which is connected to the token memory 15C within address range C within the memory address space 100 by multiplexer 50. The connection is configured to the multiplexer 50 by the token control unit FU-CTL as a response to the send_data(C) command sent by the processor core Y to the token control unit FU-CTL in shared communication unit 3. The token LSU unit FU-6 in the shared communication unit 3 recognizes that this is an access to the address range 90Y in local address space of processor core Y, which is connected to the address range C in the address space 100 by multiplexer 50 connecting the token LSU FU-6 to the token memory 15C.

Figure 3:
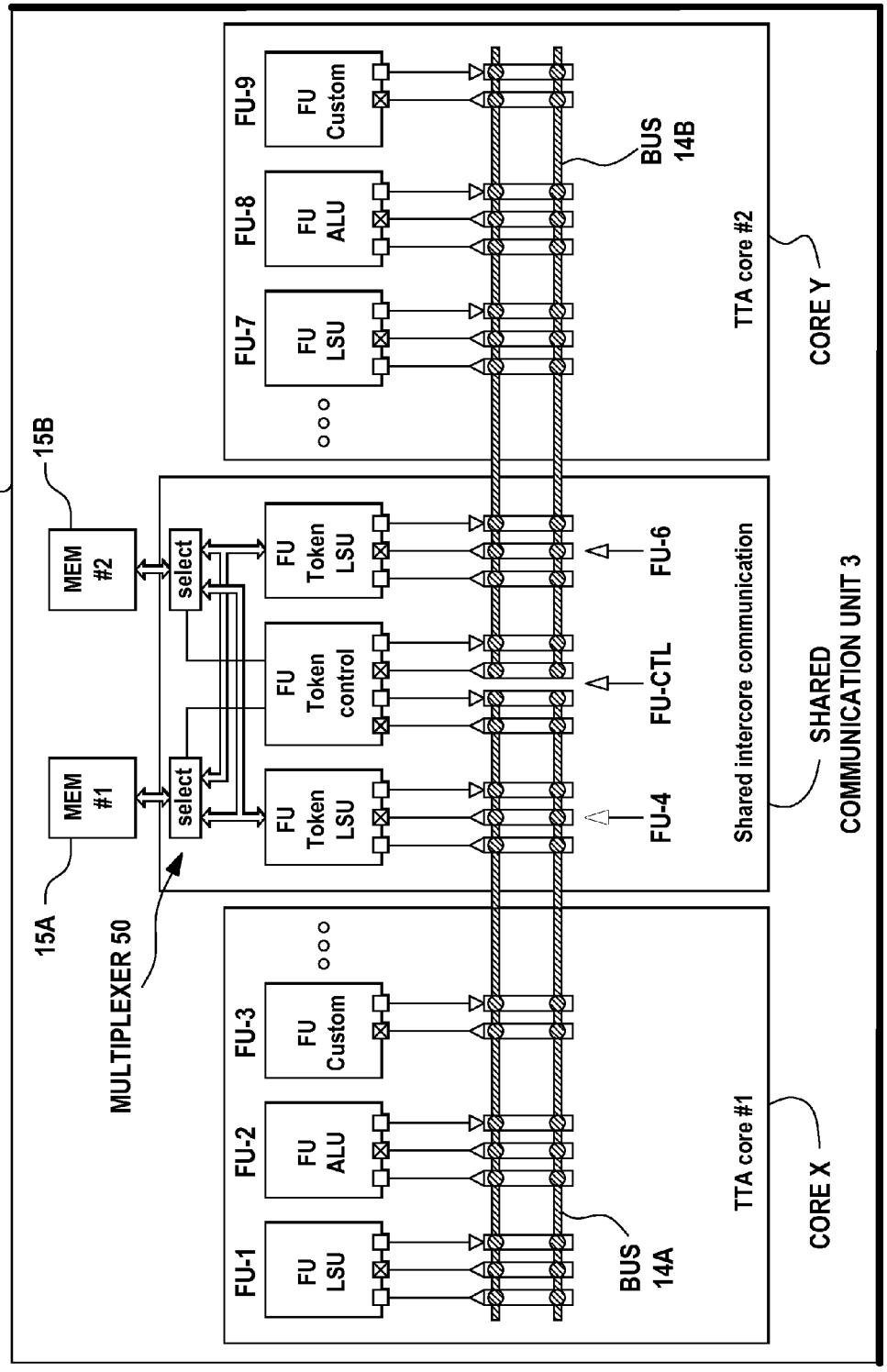
FIG. 3 illustrates an example embodiment of a multi-core processor architecture, wherein the first processor core and second processor core are transport triggered architecture (TTA) processors, in accordance with example embodiments of the invention.

FIG. 3 illustrates an example embodiment of the invention, wherein the multi-core processor architecture of FIG. 1, may include the first processor core X and second processor core Y being transport triggered architecture (TTA) processors, in accordance with example embodiments of the invention. In an example embodiment of the invention, transport triggered architecture (TTA) enables an application program to directly control the processor cores' internal buses and data transfer between functional units (FUs) FU-2, FU-8, their register files (RFs), memory load/store units (LSUs) FU-1, FU-7, and other processor building blocks. Instruction scheduling may be done statically (at compile time) and instruction level parallelism may be exploited by using a very long instruction word (VLIW) architecture and multiple buses to execute data transfers in parallel. TTA architecture is well suited for high performance computing, such as radio baseband processing. It is easy to add custom functional units FU-3, FU-9 for application-specific needs, because instructions are data transfers and there is no need to add new instructions to access custom functional units. An advantage of TTA architecture is that results may be directly forwarded from a producing FU to a consuming FU, thereby avoiding the storing of intermediate results to registers. This may allow smaller register files, better performance, and lower energy consumption. Bottlenecks may be avoided by allowing direct data forwarding. All these benefits may make TTA a good choice for a baseband processor in a software defined radio (SDR).

In a TTA processor core, there may not necessarily be any single memory management unit taking care of all memory address translations. For example, if there are multiple LSUs, each LSU may connect to a different logical and/or physical memory address space and memory hierarchy. Therefore, the actual physical memory device implementing the memory space for the token memories may be part of the common memory system or, alternately, it may be a separate physical memory.

In an example embodiment of the invention, example processing in one kernel running in TTA processor core using a simple application programming interface (API) with two blocking calls may include the following:

1 Receive input data from a producer processor FU-2 in the TTA core X, by calling get_data( ). The call may be implemented as a command transfer to the token control unit FU-CTL, which causes the multiplexer 50 to connect memory space 100 containing an incoming data token 15A to the TTA core X.

2 Process the input data and produce results to the output token memory 15B. Both input token memory 15A and output token memory 15B may be used as work space during the processing, since they are dedicated to the TTA processor core X as long as the processing takes place in processor core X.

3 Send the results to the next TTA processor core Y by calling send_data( ). The call may be implemented as a command that releases the output token memory 15B (that will be used as an input token memory of the TTA processor core Y), and connect the output token memory 15B to TTA processor core Y.

In an example embodiment of the invention, the API calls may cause commands to be transferred into the token control unit FU-CTL that takes care of reconnecting the full token memory 15B to the consuming TTA processor core Y when it is ready to process data. The token control unit FU-CTL may reconnect the empty token memory 15A to the producer processor core X after processor core X as completed the previous firing.

In an example embodiment of the invention, the example multi-core TTA processor MP of FIG. 3 is shown with dynamically connected token memories 15A and 15B. The figure uses small square symbols in the functional processor unit to represent ports. The crossed square symbol represents a port that initiates operation of the functional processor unit when accessed. In an example embodiment of the invention, the token control FU-CTL connects and disconnects the token memories 15A and 15B to load-store units (LSU) FU-4 and FU-6. In an example embodiment of the invention, the amount of token memories 15A and 15B may be greater than two, which may allow a producer TTA processor core to produce several output data tokens before the token memories are consumed. In an example embodiment of the invention, multiple token memories may enable their serialized access.

In an example embodiment of the invention, an optimized API may be introduced to use token memories more efficiently. The optimized API may include the following instructions:

Acquire_input( )—acquire_input token data memory
Release_input( )—input processing is completed and token data memory may be used by some other processor core
Acquire_output( )—acquire empty output token data memory
Release_output( )—output token is disconnected and may be processed by the next processor core.

In an example embodiment of the invention, the Acquire_input( ) and Acquire_output( ) calls are blocking, that is, program execution continues when a token memory is connected. This optimized API may allow a programmer to reserve token memories for shorter intervals. This may be an improvement when duration of the connection needed for the output token memory and/or input token memory is short compared to the duration of kernel execution.

Figure 3A:
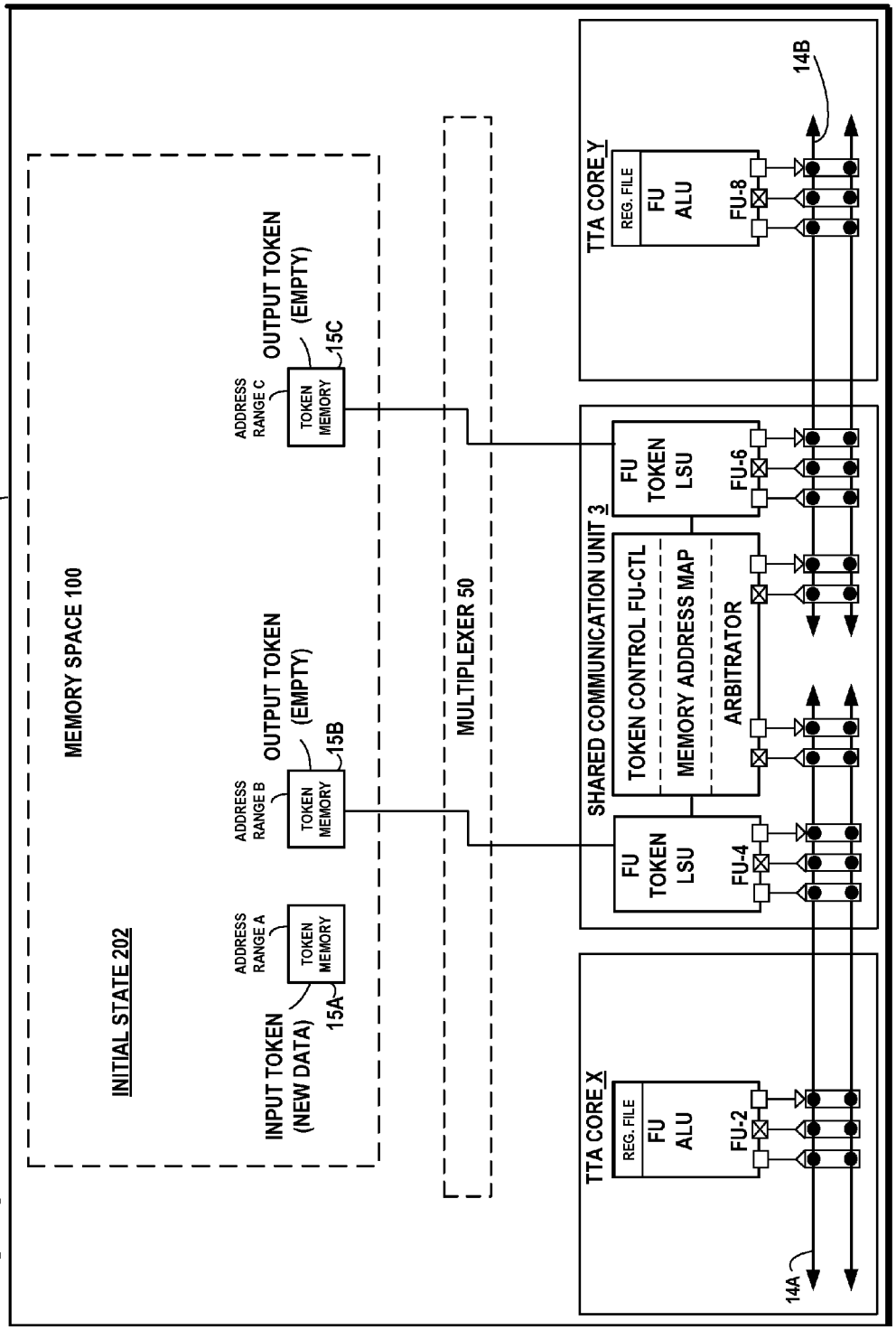
FIG. 3A illustrates an example embodiment of the multi-core processor architecture with transport triggered architecture (TTA) processor cores of FIG. 3, in an initial state with an empty output token memory connected to the shared inter-core communication unit, the figure showing an input token memory that is not connected, but which has been previously filled with initial input data from a source, such as a processor, an input device or the main memory system, in accordance with example embodiments of the invention.

FIG. 3A illustrates an example embodiment of the multi-core processor architecture with transport triggered architecture (TTA) processor cores of FIG. 3, in an initial state with an empty output token memory connected to the shared inter-core communication unit, the figure showing an input token memory that is not connected, but which has been previously filled with initial input data from a source, such as a processor, an input device or the main memory system, in accordance with example embodiments of the invention.

Figure 3B:
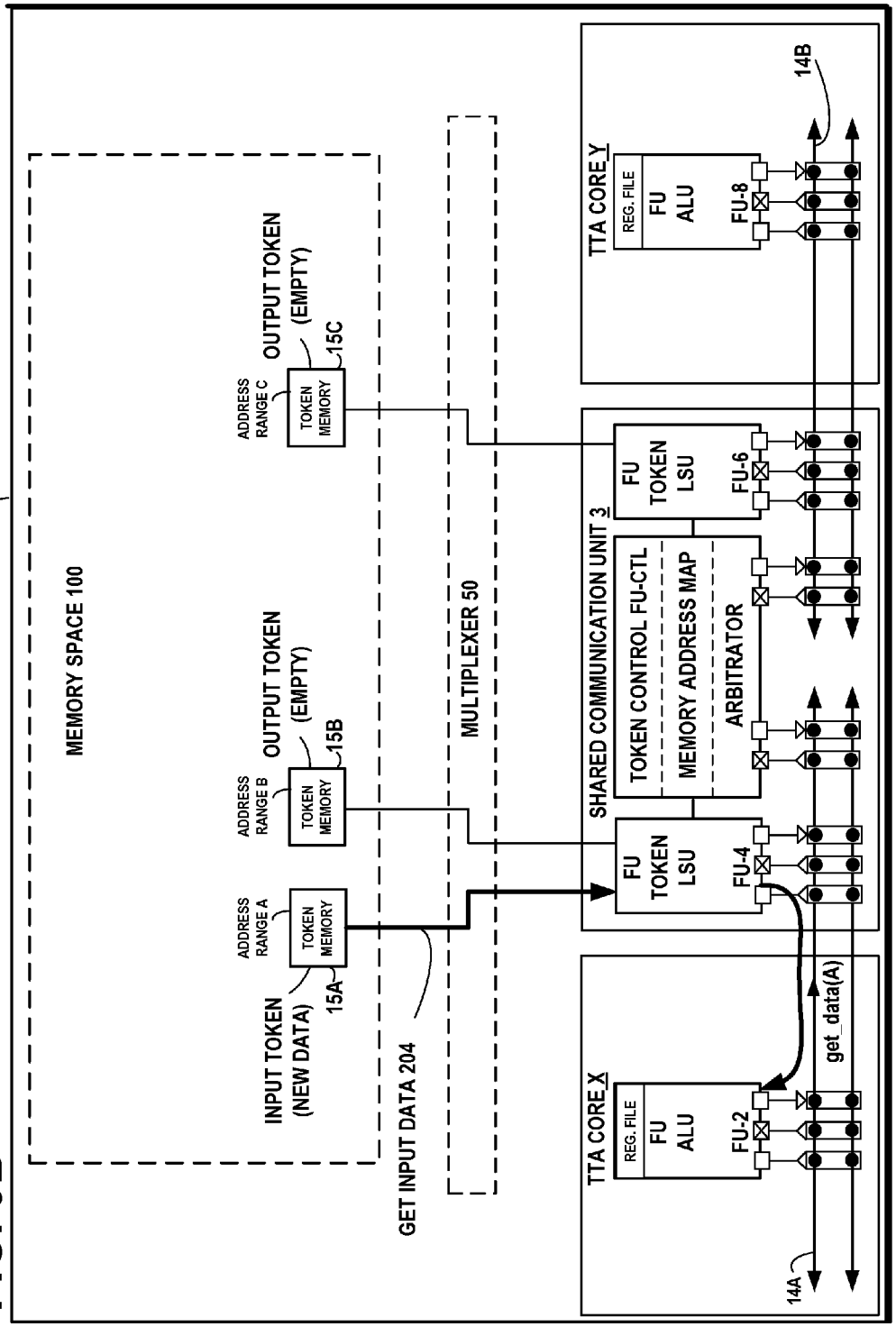
FIG. 3B illustrates an example embodiment of the multi-core processor architecture with transport triggered architecture (TTA) processor cores of FIG. 3A, illustrating receiving input data in the first processor core from the input token memory connected to the shared inter-core communication unit, in response to a token control functional unit in the shared inter-core communication unit receiving a get_data( ) command, in accordance with example embodiments of the invention.

FIG. 3B illustrates an example embodiment of the multi-core processor architecture with transport triggered architecture (TTA) processor cores of FIG. 3A, illustrating receiving input data in the first processor core from the input token memory connected to the shared inter-core communication unit, in response to a token control functional unit in the shared inter-core communication unit receiving a get_data( ) command, in accordance with example embodiments of the invention.

Figure 3C:
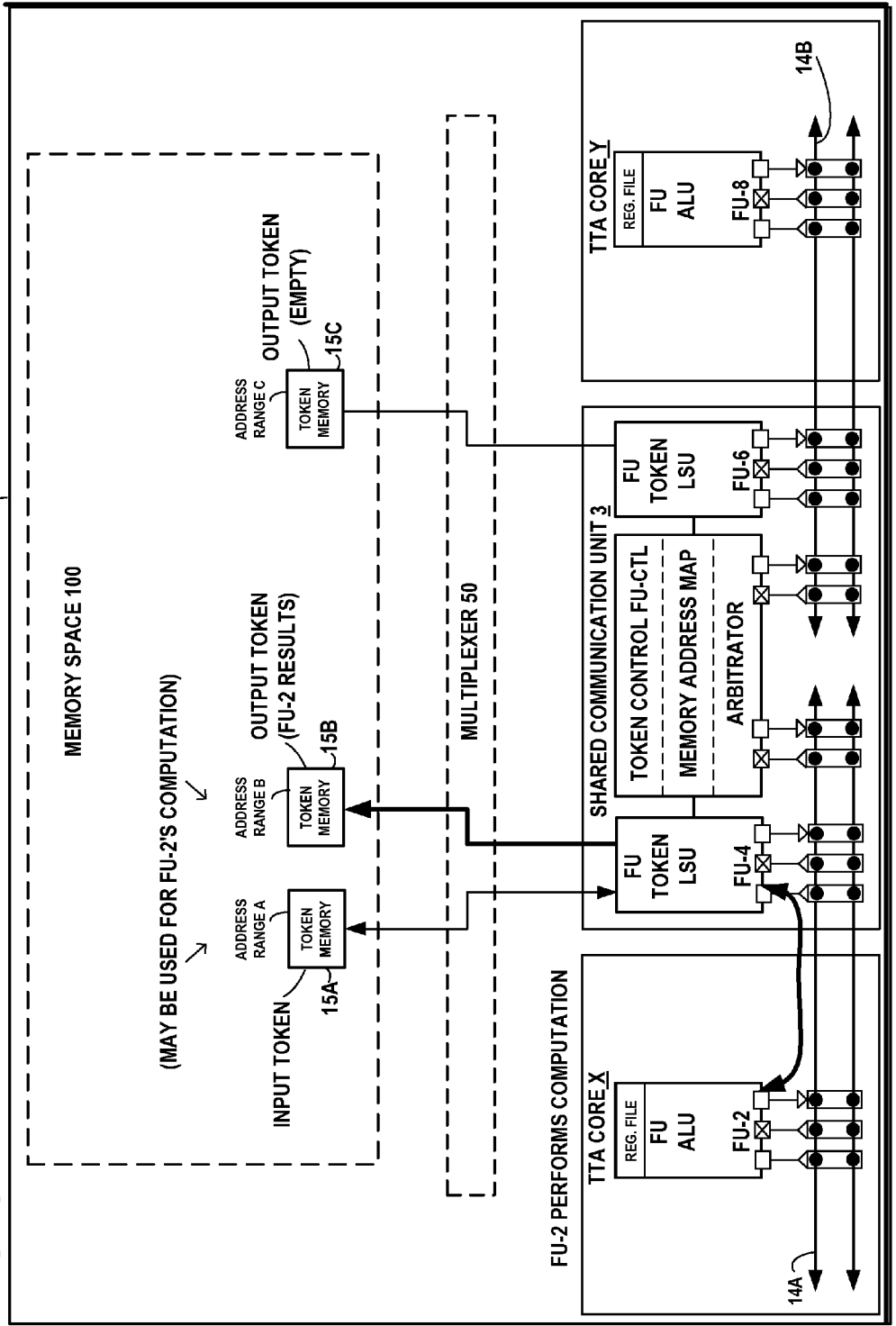
FIG. 3C illustrates an example embodiment of the multi-core processor architecture with transport triggered architecture (TTA) processor cores of FIG. 3B, illustrating a functional ALU unit in the first processor core processing the input data and producing result data to the output token memory connected to the shared inter-core communication unit, in accordance with example embodiments of the invention.

FIG. 3C illustrates an example embodiment of the multi-core processor architecture with transport triggered architecture (TTA) processor cores of FIG. 3B, illustrating a functional ALU unit in the first processor core processing the input data and producing result data to the output token memory connected to the shared inter-core communication unit, in accordance with example embodiments of the invention.

Figure 3D:
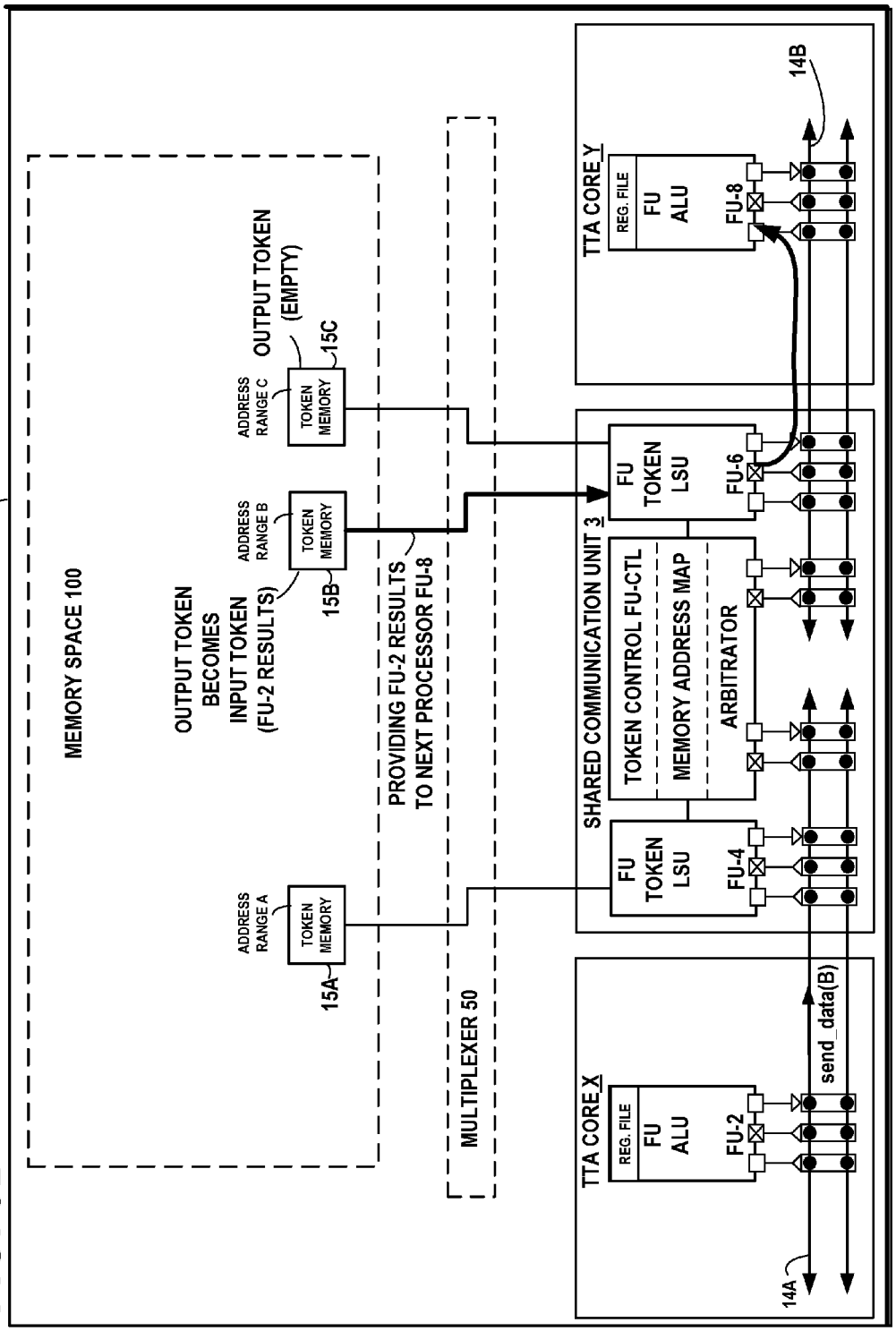
FIG. 3D illustrates an example embodiment of the multi-core processor architecture with transport triggered architecture (TTA) processor cores of FIG. 3C, illustrating output token memory connected to the shared inter-core communication unit sending the result data to a next functional processor in the second processor core, in response to the token control functional unit in the shared inter-core communication unit receiving a send_data( ) command, in accordance with example embodiments of the invention.

FIG. 3D illustrates an example embodiment of the multi-core processor architecture with transport triggered architecture (TTA) processor cores of FIG. 3C, illustrating output token memory connected to the shared inter-core communication unit sending the result data to a next functional processor in the second processor core, in response to the token control functional unit in the shared inter-core communication unit receiving a send_data( ) command, in accordance with example embodiments of the invention.

Figure 3E:
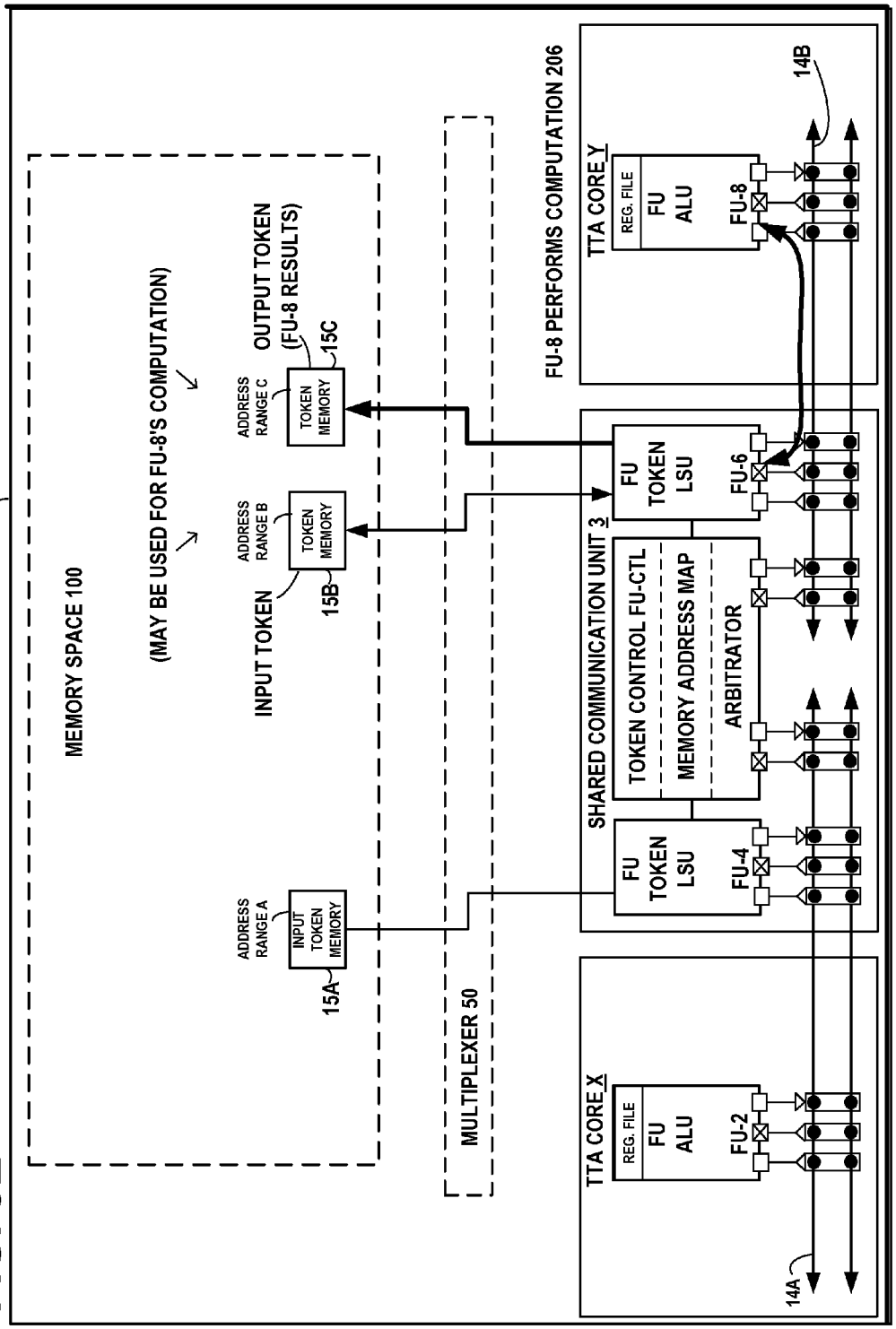
FIG. 3E illustrates an example embodiment of the multi-core processor architecture with transport triggered architecture (TTA) processor cores of FIG. 3D, illustrating a functional ALU unit in the second processor core processing the new input data and producing new result data to a second output token memory connected to the shared inter-core communication unit, in accordance with example embodiments of the invention.

FIG. 3E illustrates an example embodiment of the multi-core processor architecture with transport triggered architecture (TTA) processor cores of FIG. 3D, illustrating a functional ALU unit in the second processor core processing the new input data and producing new result data to a second output token memory connected to the shared inter-core communication unit, in accordance with example embodiments of the invention.

Figure 4A:
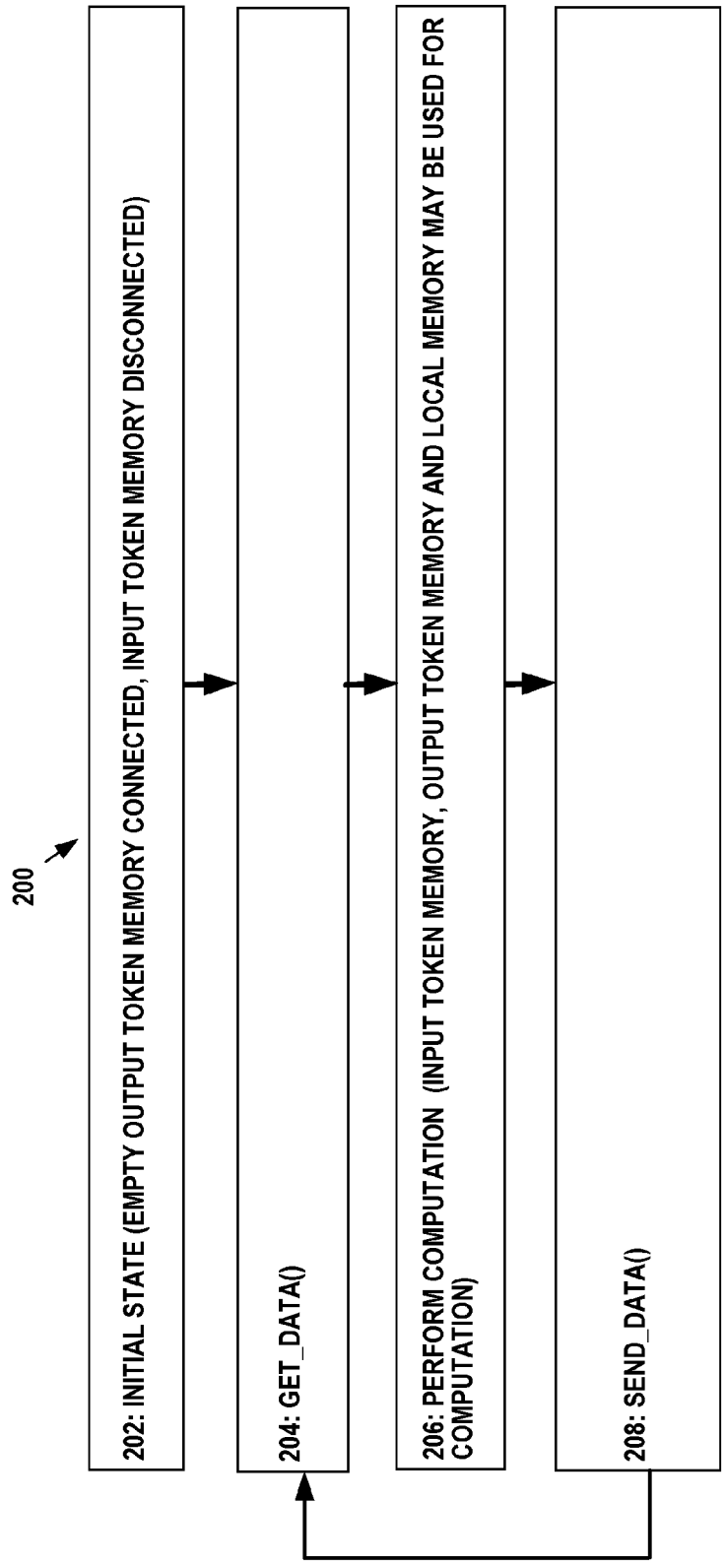
FIG. 4A illustrates an example flow diagram of the operation of first (simple) API for using token memories, corresponding to the operation of the system architecture shown in FIGS. 2A to 2E, in accordance with an example embodiment of the invention.

FIG. 4A illustrates an example embodiment of the invention, wherein an example flow diagram 200 shows the operation of a first API for using token memories, corresponding to the operation of the system architecture shown in FIGS. 2A to 2E, in accordance with an example embodiment of the invention. The figure illustrates an example of the procedure carried out by an apparatus, for example the multi-core processor MP, in executing-in-place program code stored in the memory of the apparatus. The procedure of the flow diagram may be embodied as program logic stored in the memory of the apparatus in the form of sequences of programmed instructions which, when executed in the logic of the apparatus, carry out the functions of an exemplary disclosed embodiment. The procedure may be carried out in another order than shown and individual procedures may be combined or separated into component procedures. Additional procedures may be inserted into this sequence. The procedure follows:

202: initial state (empty output token memory connected, input token memory disconnected)
204: get_data( )
206: perform computation (input token memory, output token memory and local memory may be used for computation)
208: send_data( )

Then, procedure 208 loops back to procedure 204.

Figure 4B:
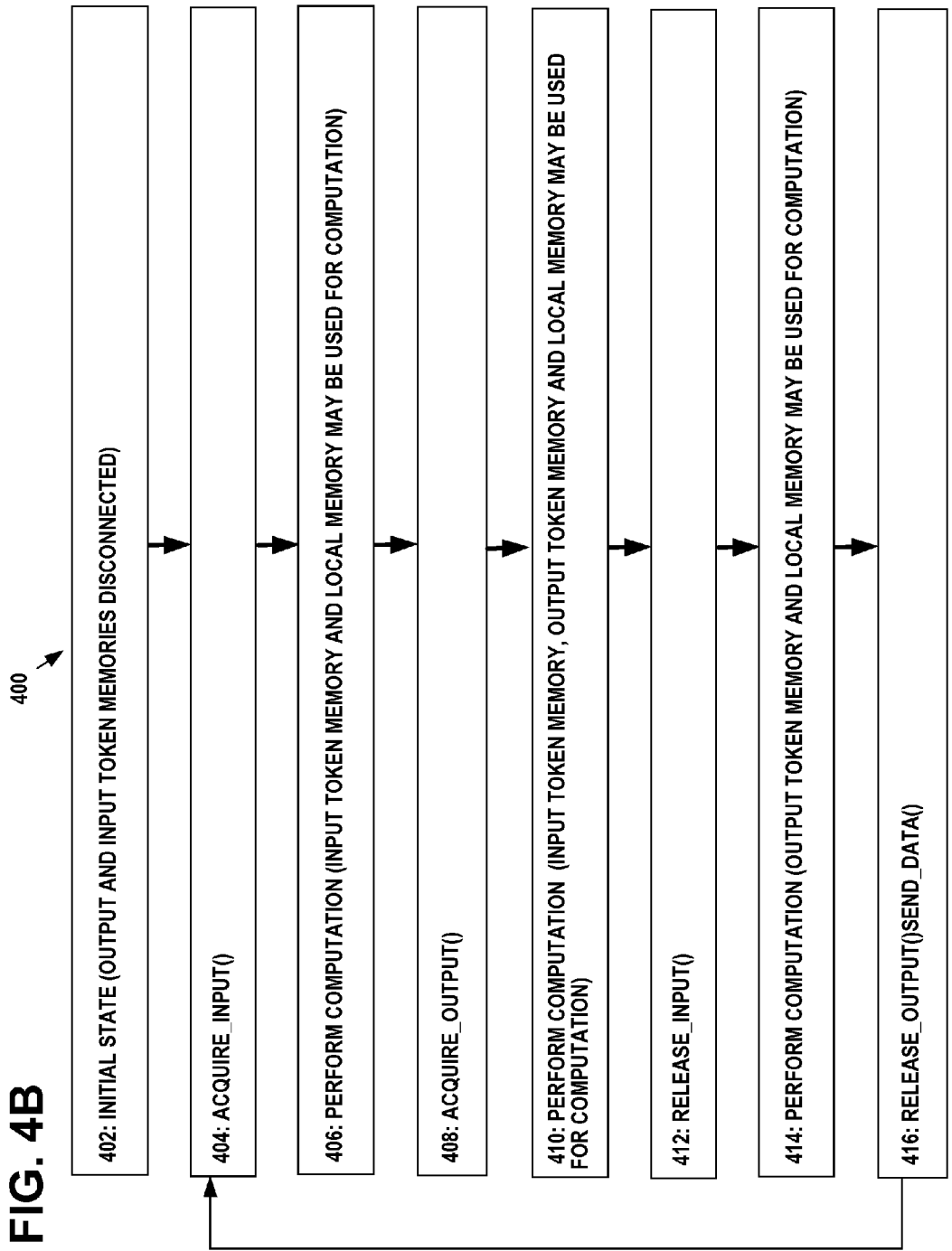
FIG. 4B illustrates an example flow diagram of the operation of a kernel acquiring both input and output token memories and using both of them simultaneously before releasing them, in accordance with an example embodiment of the invention.

FIG. 4B illustrates an example embodiment of the invention, wherein an example flow diagram 400 shows the operation of a kernel acquiring both input and output token memories and using both of them simultaneously before releasing them, in accordance with an example embodiment of the invention. The figure illustrates an example of the procedure carried out by an apparatus, for example the multi-core processor MP, in executing-in-place program code stored in the memory of the apparatus. The procedure of the flow diagram may be embodied as program logic stored in the memory of the apparatus in the form of sequences of programmed instructions which, when executed in the logic of the apparatus, carry out the functions of an exemplary disclosed embodiment. The procedure may be carried out in another order than shown and individual procedures may be combined or separated into component procedures. Additional procedures may be inserted into this sequence. The procedure follows:

402: initial state (output and input token memories disconnected)

404: acquire_input( )

406: perform computation (input token memory and local memory may be used for computation)

408: acquire_output( )

410: perform computation (input token memory, output token memory and local memory may be used for computation)

412: release_input( )

414: perform computation (output token memory and local memory may be used for computation)

416: release_output( )

Then, procedure 416 loops back to procedure 404.

The release_output( ) signal indicates that the token is ready and an acquire_input( ) of a consumer core may connect the token memory to the consumer core. In case the consumer core has called acquire_input( ) before the producer core has called release_output( ) there may be a return from blocking the acquire_input( ) call.

Figure 4C:
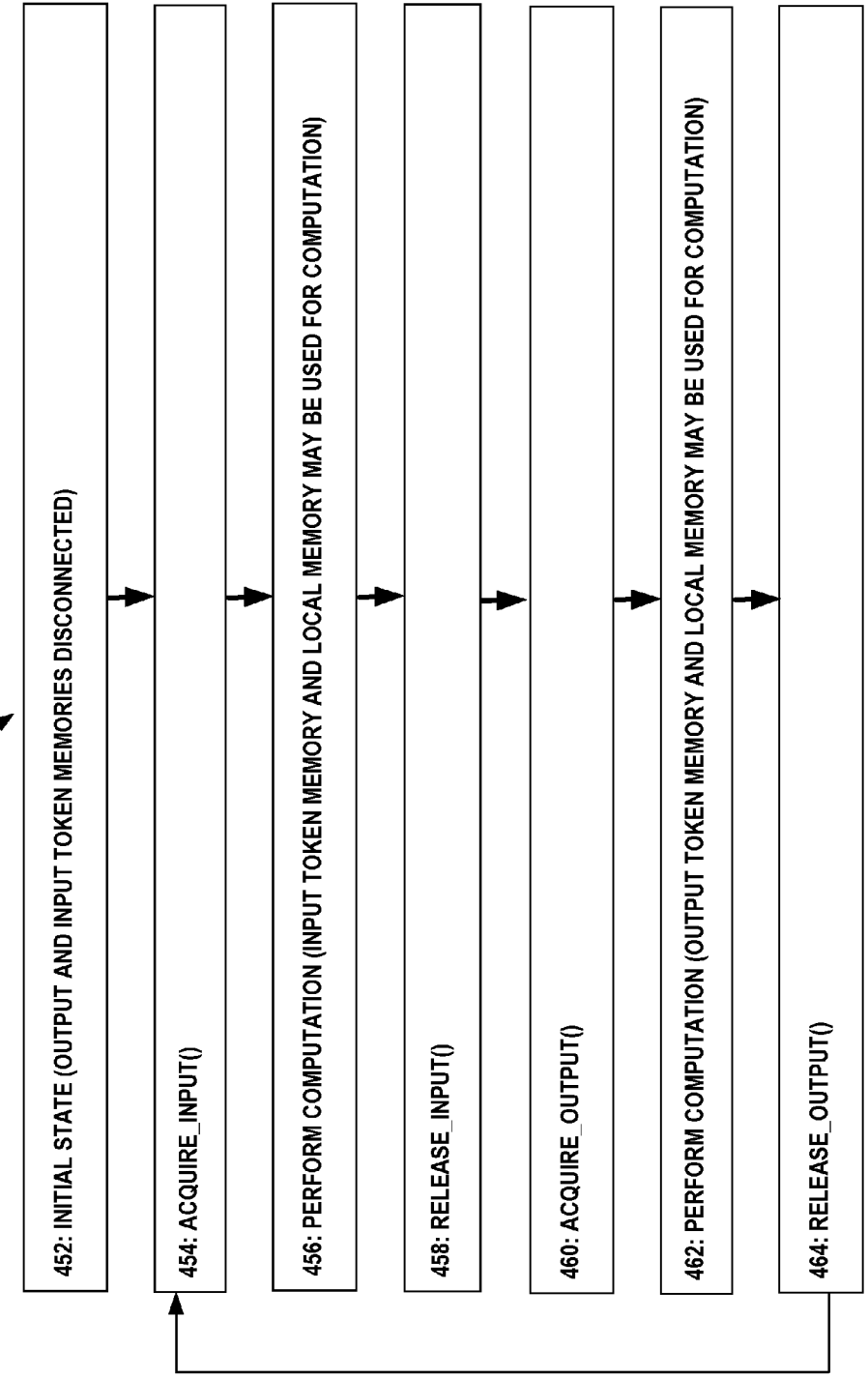
FIG. 4C illustrates an example flow diagram of the operation of a kernel releasing an input token memory before acquiring an output token memory, according to an embodiment of the present invention.

FIG. 4C illustrates an example embodiment of the invention, wherein an example flow diagram 450 shows the operation of a kernel releasing an input token memory before acquiring an output token memory, according to an embodiment of the present invention. The figure illustrates an example of the procedure carried out by an apparatus, for example the multi-core processor MP, in executing-in-place program code stored in the memory of the apparatus. The procedure of the flow diagram may be embodied as program logic stored in the memory of the apparatus in the form of sequences of programmed instructions which, when executed in the logic of the apparatus, carry out the functions of an exemplary disclosed embodiment. The procedure may be carried out in another order than shown and individual procedures may be combined or separated into component procedures. Additional procedures may be inserted into this sequence. The procedure follows:

452: initial state (output and input token memories disconnected)

454: acquire_input( )

456: perform computation (input token memory and local memory may be used for computation)

458: release_input( )

460: acquire_output( )

462: perform computation (output token memory and local memory may be used for computation)

464: release_output( )

Then, procedure 416 loops back to procedure 404.

Figure 5:
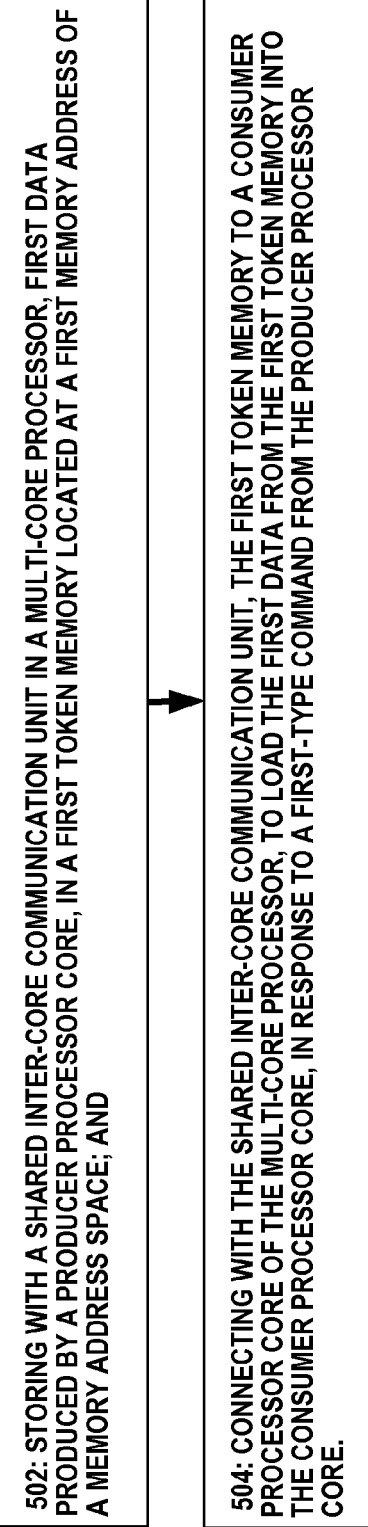
FIG. 5 illustrates an example flow diagram of the operation of the multi-core processor of FIG. 1, in accordance with an example embodiment of the invention.

FIG. 5 illustrates an example flow diagram 500 of the operation of the multi-core processor of FIG. 1, in accordance with an example embodiment of the invention. The figure illustrates an example of the procedure carried out by an apparatus, for example the multi-core processor MP, in executing-in-place program code stored in the memory of the apparatus. The procedure of the flow diagram may be embodied as program logic stored in the memory of the apparatus in the form of sequences of programmed instructions which, when executed in the logic of the apparatus, carry out the functions of an exemplary disclosed embodiment. The procedure may be carried out in another order than shown and individual procedures may be combined or separated into component procedures. Additional procedures may be inserted into this sequence. The procedure follows:

502: storing with a shared inter-core communication unit in a multi-core processor, first data produced by a producer processor core, in a first token memory located at a first memory address of a memory address space; and 504: connecting with the shared inter-core communication unit, the first token memory to a consumer processor core of the multi-core processor, to load the first data from the first token memory into the consumer processor core, in response to a first-type command from the producer processor core.

Figure 6A:
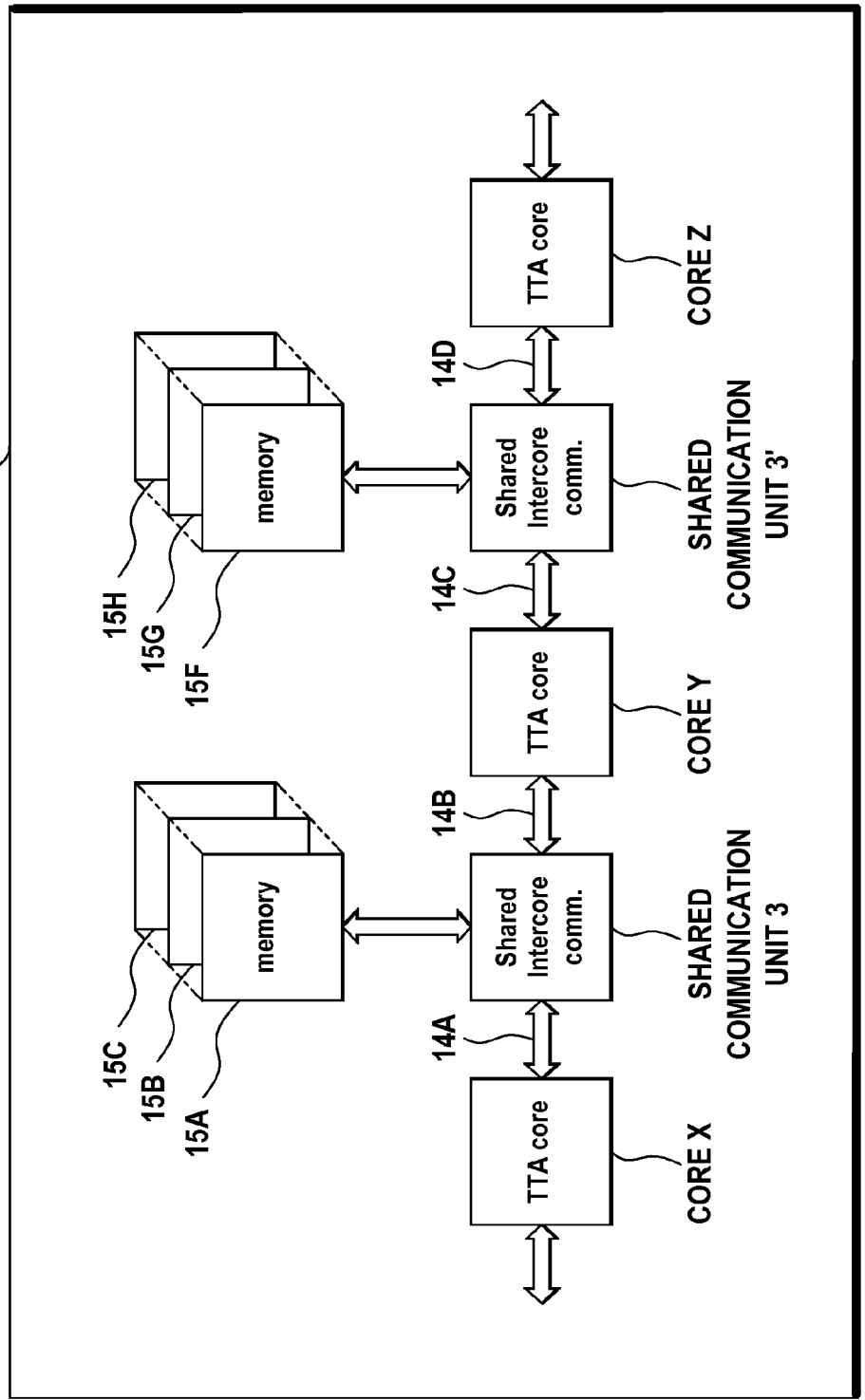
FIG. 6A illustrates an example embodiment of the system architecture of an example multi-core processor of FIGS. 1 and 3, wherein token memories organized as a pipeline, in accordance with example embodiments of the invention.

FIG. 6A illustrates an example embodiment of the system architecture of an example multi-core processor of FIGS. 1 and 3, wherein token memories organized as a pipeline multi-core processor MP, in accordance with example embodiments of the invention. The pipeline multi-core processor MP of FIG. 6A may perform the following procedures:

Connect with a shared inter-core communication unit 3, a first token memory 15A located at a first memory address A of a memory address space 100, to a first processor core X of a multi-core processor MP, to load input data from the first token memory 15A into the first processor core X, in response to a first command "get_data(A)" from the first processor core X.

Store with the shared inter-core communication unit 3, result data produced by the first processor core X from the input data, in a second token memory 15B located at a second memory address B of the memory address space 100.

Connect with the shared inter-core communication unit 3, the second token memory 15B located at the second memory address B of the memory address space 100, to a second processor core Y of the multi-core processor, to load the result data from the second token memory 15B into the second processor core Y, in response to a second command "send_data(B)" from the first processor core X.

Store with the shared inter-core communication unit 3, second result data produced by the second processor core Y from the first said result data, in a third token memory 15C located at a third memory address C of the memory address space 100.

Connecting with a second shared inter-core communication unit 3', the third token memory 15C located at the third memory address C of the memory address space 100, to a third processor core Z of the multi-core processor MP, to load the second result data from the third token memory 15C as pipelined data into the third processor core Z, in response to a third command "get_data(C)" from the second processor core Y.

Storing with the second shared inter-core communication unit 3', third result data produced by the third processor core Z from the second result data, in a fourth token memory 15F located at a fourth memory address F of the memory address space 100.

Figure 6B:
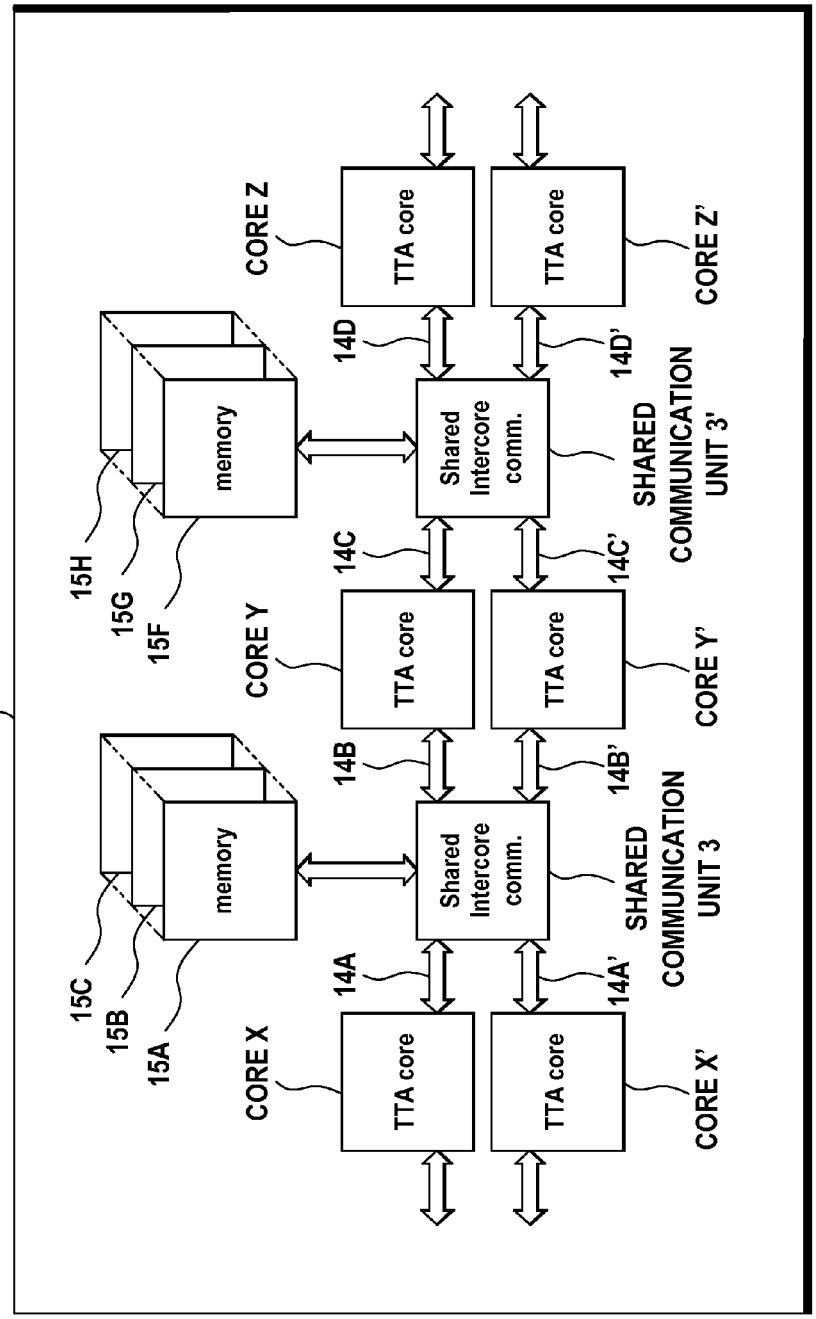
FIG. 6B illustrates an example embodiment of the system architecture of an example multi-core processor of FIGS. 1 and 3, wherein more than two processor cores are connected to one shared inter-core communication unit, in accordance with example embodiments of the invention.

FIG. 6B illustrates an example embodiment of the system architecture of an example multi-core processor MP of FIGS. 1 and 3, wherein more than two processor cores X, X', Y, and Y' are connected to one shared inter-core communication unit 3, in accordance with example embodiments of the invention.

Figure 6C:
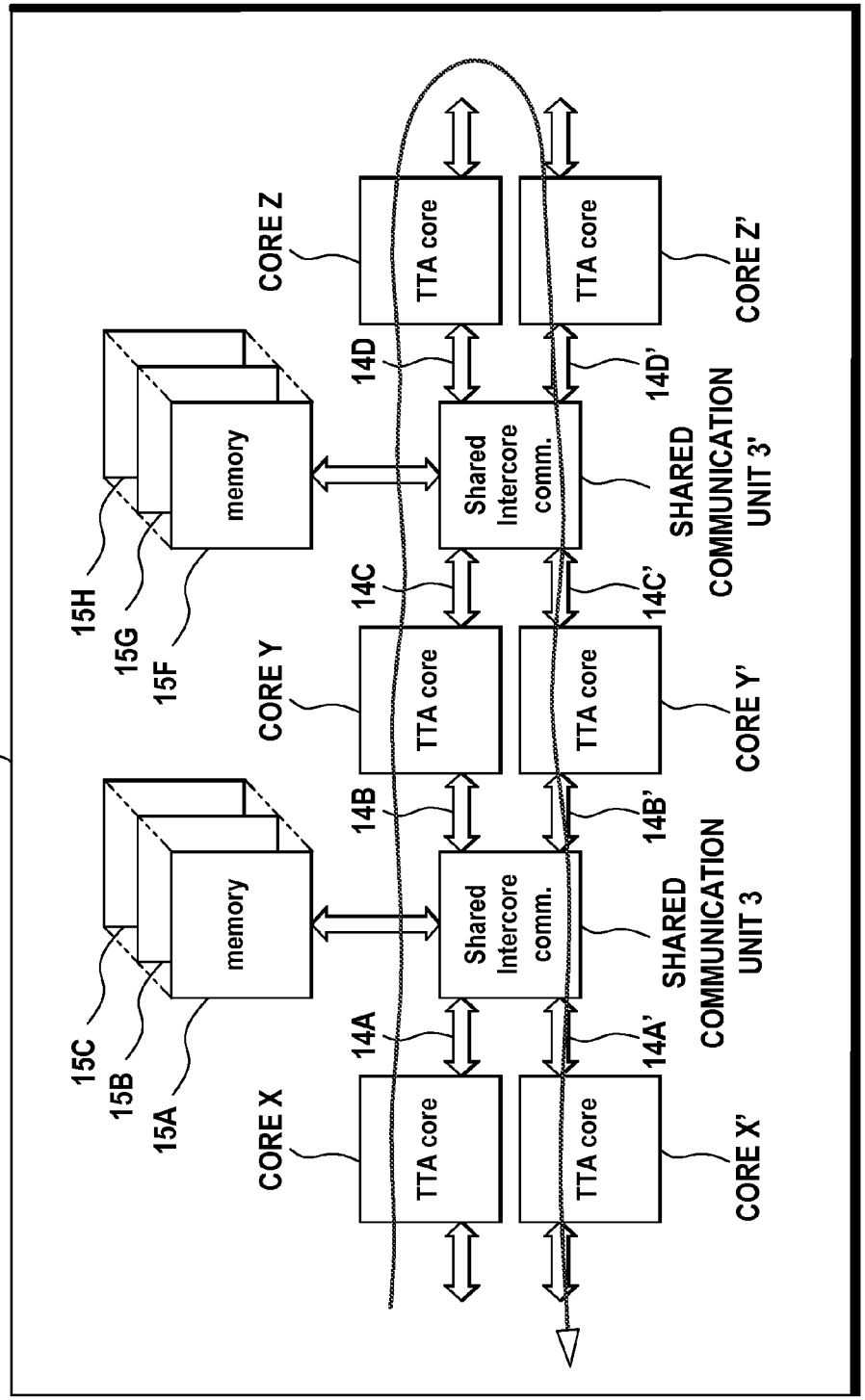
FIG. 6C illustrates an example embodiment of the system architecture of an example multi-core processor of FIGS. 1 and 3, wherein more than two processor cores are connected in a long pipeline, in accordance with example embodiments of the invention.

FIG. 6C illustrates an example embodiment of the system architecture of an example multi-core processor MP of FIGS. 1 and 3, wherein more than two processor cores X, Y, Z, Z', Y', and X' are connected in a long pipeline, in accordance with example embodiments of the invention.

Figure 6D:
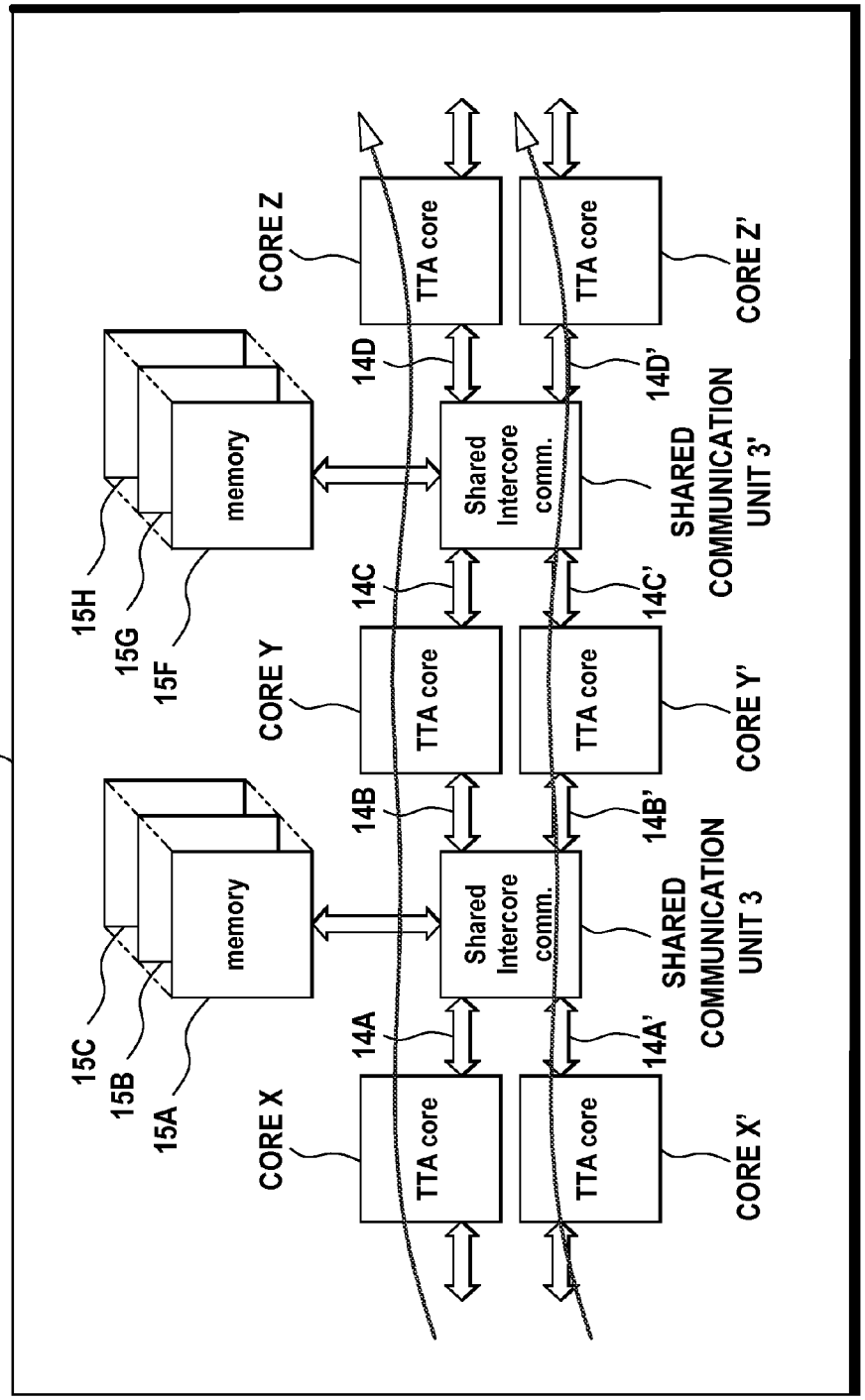
FIG. 6D illustrates an example embodiment of the system architecture of an example multi-core processor of FIGS. 1 and 3, wherein more than two processor cores are connected in dual pipelines, in accordance with example embodiments of the invention.

FIG. 6D illustrates an example embodiment of the system architecture of an example multi-core processor of FIGS. 1 and 3, wherein more than two processor cores X, Y, Z in a first pipeline and X', Y', Z' in a second pipeline are connected in dual pipelines, in accordance with example embodiments of the invention.

Figure 6E:
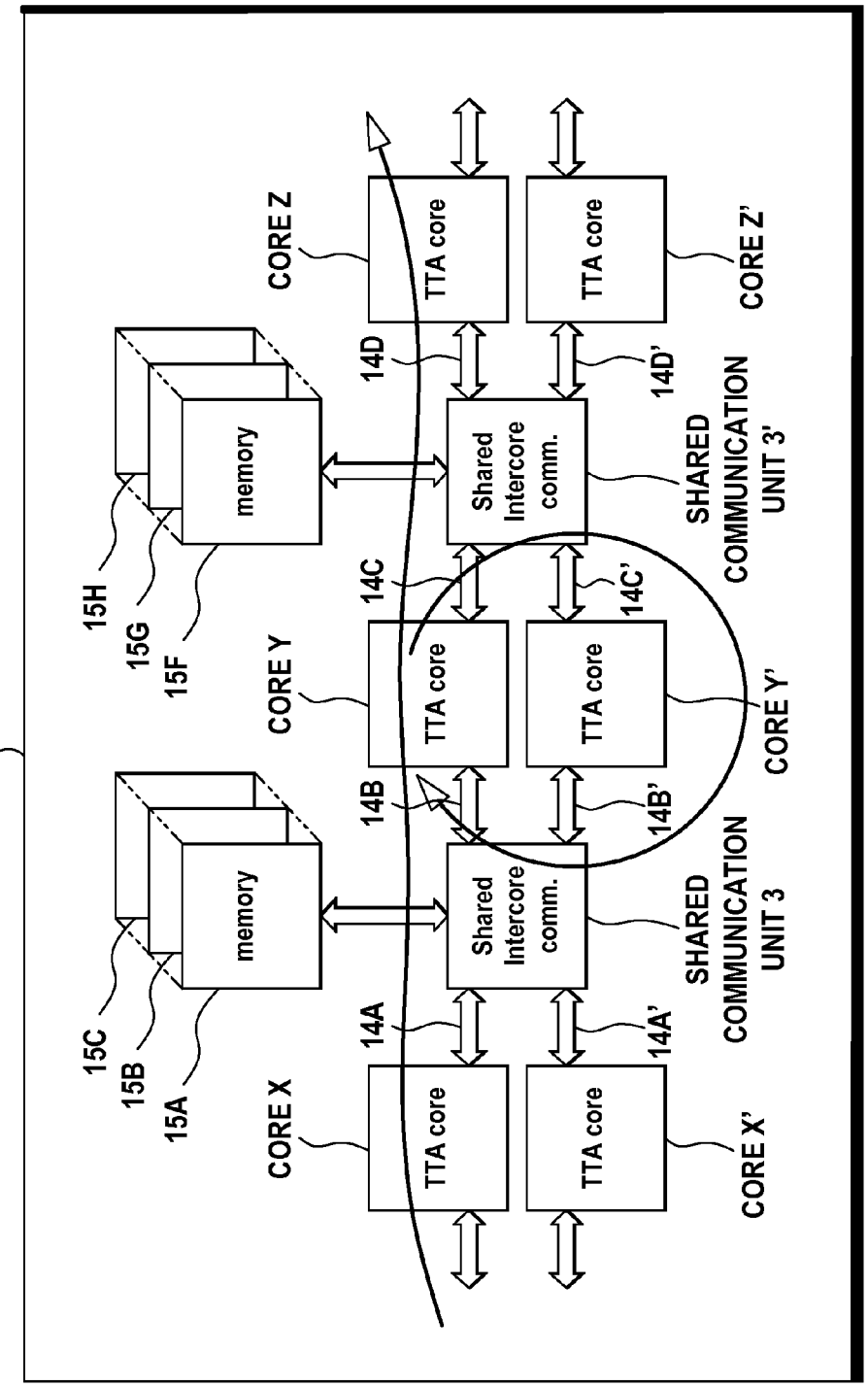
FIG. 6E illustrates an example embodiment of the system architecture of an example multi-core processor of FIGS. 1 and 3, wherein the results of kernel firing are processed and fed back for the next execution of the kernel, in accordance with example embodiments of the invention.

FIG. 6E illustrates an example embodiment of the system architecture of an example multi-core processor MP of FIGS. 1 and 3, wherein the results of kernel firing are processed and fed back for the next execution of the kernel, in accordance with example embodiments of the invention. The pipeline multi-core processor MP of FIG. 6E may perform the following procedures of connecting with the shared inter-core communication unit 3', the third token memory 15C located at the third memory address C of the memory address space 100, to the first processor core X of the multi-core processor MP, to load the second result data from the third token memory 15C as feedback data into the first processor core X, in response to a third command "feedback_data(C)" from the second processor core Y'.

Figure 7:
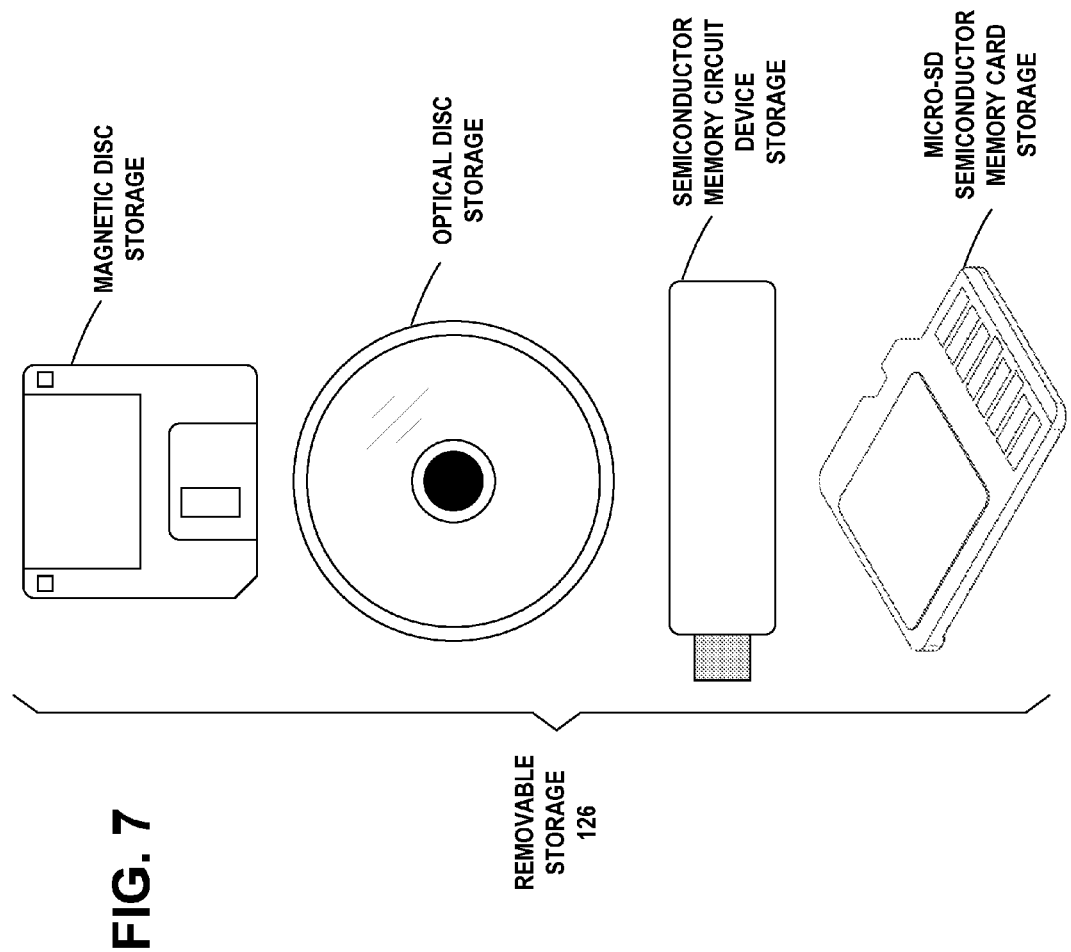
FIG. 7 illustrates an example embodiment of the invention, wherein examples of removable storage media are shown, based on magnetic, electronic and/or optical technologies, such as magnetic disks, optical disks, semiconductor memory circuit devices, and micro-SD semiconductor memory cards (SD refers to the Secure Digital standard) for storing data and/or computer program code as an example computer program product, in accordance with at least one embodiment of the present invention.

FIG. 7 illustrates an example embodiment of the invention, wherein examples of removable storage media 126 are shown, based on magnetic, electronic and/or optical technologies, such as magnetic disks, optical disks, semiconductor memory circuit devices and micro-SD semiconductor memory cards (SD refers to the Secure Digital standard), for storing data and/or computer program code as an example computer program product, in accordance with at least one embodiment of the present invention.

Figure 8C:
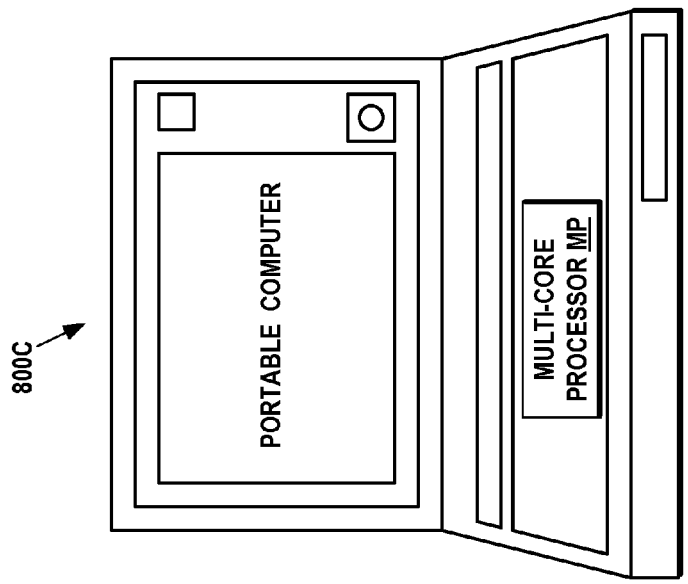
FIG. 8C illustrates an example embodiment of the invention, wherein the multi-core processor MP is a component of a portable computer 800C, in accordance with at least one embodiment of the present invention.
Figure 8B:
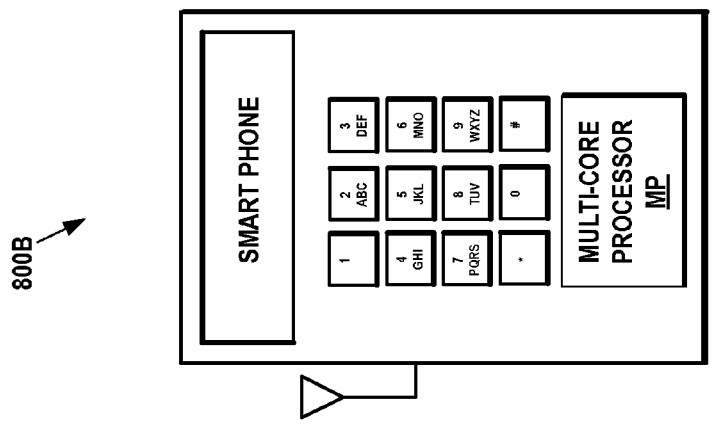
FIG. 8B illustrates an example embodiment of the invention, wherein the multi-core processor MP is a component of a smart phone 800B, in accordance with at least one embodiment of the present invention.
Figure 8A:
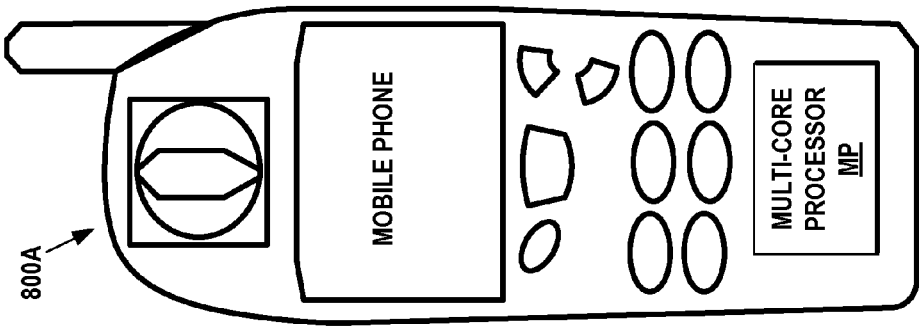
FIG. 8A illustrates an example embodiment of the invention, wherein the multi-core processor MP is a component of a mobile phone 800A, in accordance with at least one embodiment of the present invention.

In example embodiments of the invention, the multi-core processor MP is a component of an electronic device, such as for example a mobile phone 800A shown in FIG. 8A, a smart phone 800B shown in FIG. 8B, or a portable computer 800C shown in FIG. 8C, in accordance with at least one embodiment of the present invention.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable, non-transitory medium.

As indicated above, memory/storage devices include, but are not limited to, disks, optical disks, removable memory devices such as smart cards, subscriber identity modules (SIMs), wireless identification modules (WIMs), semiconductor memories such as random access memories (RAMs), read only memories (ROMs), programmable read only memories (PROMs), etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. An apparatus, comprising:
at least two processors;
at least one memory including computer program code;
the at least one memory and the computer program code configured to, with the at least one processor, cause the apparatus at least to:
store with a shared inter-core communication unit in a multi-core processor, first data produced by a producer processor core, in a first token memory located at a first memory address of a memory address space;
connect with the shared inter-core communication unit, the first token memory to a consumer processor core of the multi-core processor, to load the first data from the first token memory into the consumer processor core, in response to a first-type command from the producer processor core;
connect with the shared inter-core communication unit, an input token memory located at an input token memory address of the memory address space, to the producer processor core of the multi-core processor, to load input data from the first token memory into the producer processor core, in response to a second-type command from the producer processor core;
store with the shared inter-core communication unit, result data produced by the producer processor core from the input data, the result data being the first data stored in the first token memory; and
connect with the shared inter-core communication unit, the first token memory to the consumer processor core of the multi-core processor, to load the result data from the first token memory into the consumer processor core, in response to the first-type command from the producer processor core.

2. The apparatus of claim 1, further comprising:
the at least one memory and the computer program code configured to, with the at least two processors, cause the apparatus at least to:
store with the shared inter-core communication unit, second result data produced by the consumer processor core from the first said result data, in a second token memory located at a second memory address of the memory address space.

3. The apparatus of claim 2, further comprising:
the at least one memory and the computer program code configured to, with the at least two processors, cause the apparatus at least to:
connect with the shared inter-core communication unit, the second token memory to the producer processor core of the multi-core processor, to load the second result data from the second token memory as feedback data into the producer processor core, in response to a command from the consumer processor core.

4. The apparatus of claim 2, further comprising:
the at least one memory and the computer program code configured to, with the at least two processors, cause the apparatus at least to:
connect with a second shared inter-core communication unit of the multi-core processor, the second token memory to a third processor core of the multi-core processor, to load the second result data from the second token memory as pipelined data into the third processor core, in response to a command from the consumer processor core.

5. The apparatus of claim 4, further comprising:
the at least one memory and the computer program code configured to, with the at least two processors, cause the apparatus at least to:
store with the second shared inter-core communication unit, third result data produced by the third processor core from the second result data, in a third token memory located at a third memory address of the memory address space.

6. A method, comprising:
storing with a shared inter-core communication unit in a multi-core processor, first data produced by a producer processor core, in a first token memory located at a first memory address of a memory address space;
connecting with the shared inter-core communication unit, the first token memory to a consumer processor core of the multi-core processor, to load the first data from the first token memory into the consumer processor core, in response to a first-type command from the producer processor core;
connecting with the shared inter-core communication unit, an input token memory located at an input token memory address of the memory address space, to the producer processor core of the multi-core processor, to load input data from the first token memory into the producer processor core, in response to a second-type command from the producer processor core;
storing with the shared inter-core communication unit, result data produced by the producer processor core from the input data, the result data being the first data stored in the first token memory; and
connecting with the shared inter-core communication unit, the first token memory to the consumer processor core of the multi-core processor, to load the result data from the first token memory into the consumer processor core, in response to the first-type command from the producer processor core.

7. The method of claim 6, further comprising:
storing with the shared inter-core communication unit, second result data produced by the consumer processor core from the first said result data, in a second token memory located at a second memory address of the memory address space.

8. The method of claim 7, further comprising:
connecting with the shared inter-core communication unit, the second token memory to the producer processor core of the multi-core processor, to load the second result data from the second token memory as feedback data into the producer processor core, in response to a command from the consumer processor core.

9. The method of claim 7, further comprising:
connecting with a second shared inter-core communication unit of the multi-core processor, the second token memory to a third processor core of the multi-core processor, to load the second result data from the second token memory as pipelined data into the third processor core, in response to a command from the consumer processor core.

10. The method of claim 9, further comprising:
storing with the second shared inter-core communication unit, third result data produced by the third processor core from the second result data, in a third token memory located at a third memory address of the memory address space.

11. A computer program product comprising computer executable program code recorded on a computer readable non-transitory storage medium, the computer executable program code, when executed by a computer processor, cause an apparatus to at least perform the following:
storing with a shared inter-core communication unit in a multi-core processor, first data produced by a producer processor core, in a first token memory located at a first memory address of a memory address space;
connecting with the shared inter-core communication unit, the first token memory to a consumer processor core of the multi-core processor, to load the first data from the first token memory into the consumer processor core, in response to a first-type command from the producer processor core;
connecting with the shared inter-core communication unit, an input token memory located at an input token memory address of the memory address space, to the producer processor core of the multi-core processor, to load input data from the first token memory into the producer processor core, in response to a second-type command from the producer processor core;
storing with the shared inter-core communication unit, result data produced by the producer processor core from the input data, the result data being the first data stored in the first token memory; and
connecting with the shared inter-core communication unit, the first token memory to the consumer processor core of the multi-core processor, to load the result data from the first token memory into the consumer processor core, in response to the first-type command from the producer processor core.

12. The computer program product of claim 11, further comprising computer executable program code recorded on a computer readable non-transitory storage medium, the computer executable program code, when executed by a computer processor, cause an apparatus to at least perform the following:
storing with the shared inter-core communication unit, second result data produced by the consumer processor core from the first said result data, in a second token memory located at a second memory address of the memory address space.

13. The computer program product of claim 12, further comprising computer executable program code recorded on a computer readable non-transitory storage medium, the computer executable program code, when executed by a computer processor, cause an apparatus to at least perform the following:
connecting with the shared inter-core communication unit, the second token memory to the producer processor core of the multi-core processor, to load the second result data from the second token memory as feedback data into the producer processor core, in response to a command from the consumer processor core.

14. The computer program product of claim 12, further comprising computer executable program code recorded on a computer readable non-transitory storage medium, the computer executable program code, when executed by a computer processor, cause an apparatus to at least perform the following:
connecting with a second shared inter-core communication unit of the multi-core processor, the second token memory to a third processor core of the multi-core processor, to load the second result data from the second token memory as pipelined data into the third processor core, in response to a command from the consumer processor core.

15. The computer program product of claim 14, further comprising computer executable program code recorded on a computer readable non-transitory storage medium, the computer executable program code, when executed by a computer processor, cause an apparatus to at least perform the following:

storing with the second shared inter-core communication unit, third result data produced by the third processor core from the second result data, in a third token memory located at a third memory address of the memory address space.

\* \* \* \* \*